(12) United States Patent
Morooka et al.

(10) Patent No.: US 7,599,125 B2
(45) Date of Patent: Oct. 6, 2009

(54) IMAGE PICKUP APPARATUS HAVING WIDE ANGLE ZOOM LENS SYSTEM

(75) Inventors: Masaru Morooka, Akishima (JP); Hideyuki Nagaoka, Hino (JP); Eiji Shirota, Hino (JP); Masahiro Katakura, Hino (JP)

(73) Assignee: Olympus Imaging Corp., Tokyo (JP)

( * ) Notice: Subject to any disclaimer, the term of this patent is extended or adjusted under 35 U.S.C. 154(b) by 0 days.

(21) Appl. No.: 12/151,450

(22) Filed: May 6, 2008

(65) Prior Publication Data

US 2009/0040623 A1 Feb. 12, 2009

(30) Foreign Application Priority Data

May 10, 2007 (JP) .............................. 2007-125900
May 16, 2007 (JP) .............................. 2007-130253

(51) Int. Cl.
*G02B 15/14* (2006.01)

(52) U.S. Cl. ..................... 359/687; 359/774; 359/726; 359/740

(58) Field of Classification Search ................. 359/676, 359/687, 695, 708, 726, 740, 758, 774
See application file for complete search history.

(56) References Cited

U.S. PATENT DOCUMENTS

| | | | |
|---|---|---|---|
| 6,771,432 B2 | 8/2004 | Mihara | |
| 6,850,373 B2 | 2/2005 | Mihara et al. | |
| 6,975,462 B2 | 12/2005 | Mihara | |
| 7,145,730 B2 | 12/2006 | Mihara | |
| 7,248,293 B2 | 7/2007 | Iwasawa | |
| 7,372,635 B2 * | 5/2008 | Morooka et al. | ............ 359/687 |
| 2003/0193722 A1 | 10/2003 | Mihara | |
| 2004/0027685 A1 | 2/2004 | Mihara et al. | |
| 2004/0105020 A1 | 6/2004 | Iwasawa | |
| 2004/0233302 A1 | 11/2004 | Kojima | |
| 2005/0002115 A1 | 1/2005 | Mihara | |
| 2006/0044423 A1 | 3/2006 | Hagimori et al. | |
| 2006/0268427 A1 | 11/2006 | Mihara | |
| 2006/0279853 A1 | 12/2006 | Morooka et al. | |

FOREIGN PATENT DOCUMENTS

| | | |
|---|---|---|
| JP | 2000-131610 | 5/2000 |
| JP | 2003-302576 | 10/2003 |

(Continued)

*Primary Examiner*—Joseph Martinez
(74) *Attorney, Agent, or Firm*—Kenyon & Kenyon LLP

(57) ABSTRACT

An image pickup apparatus having a wide angle zoom lens system includes a zoom lens system, and an image pickup element which is disposed at an image side of the zoom lens system. The zoom lens system includes in order from an object side thereof, a first lens unit G1 having a positive refracting power, a second lens unit G2 having a negative refracting power, a third lens unit G3 having a positive refracting power, a fourth lens unit G4 having a positive refracting power, and an aperture stop S which is disposed between the second lens unit G2 and the third lens unit G3. A zooming is carried out from a wide angle end to a telephoto end by fixing a position of the first lens unit, and changing a distance between the lens units by moving at least the second lens unit G2 and the third lens unit G3, and the following conditional expressions are satisfied.

$$33° < \tan^{-1}(IH_w/f_w) \quad (1)$$

$$3 < f_{1g}/f_w < 5 \quad (2).$$

19 Claims, 16 Drawing Sheets

FOREIGN PATENT DOCUMENTS

| | | |
|---|---|---|
| JP | 2004-069808 | 3/2004 |
| JP | 2004-184627 | 7/2004 |
| JP | 2004-347712 | 12/2004 |
| JP | 2006-058363 | 3/2006 |
| JP | 2006-343622 | 12/2006 |

* cited by examiner

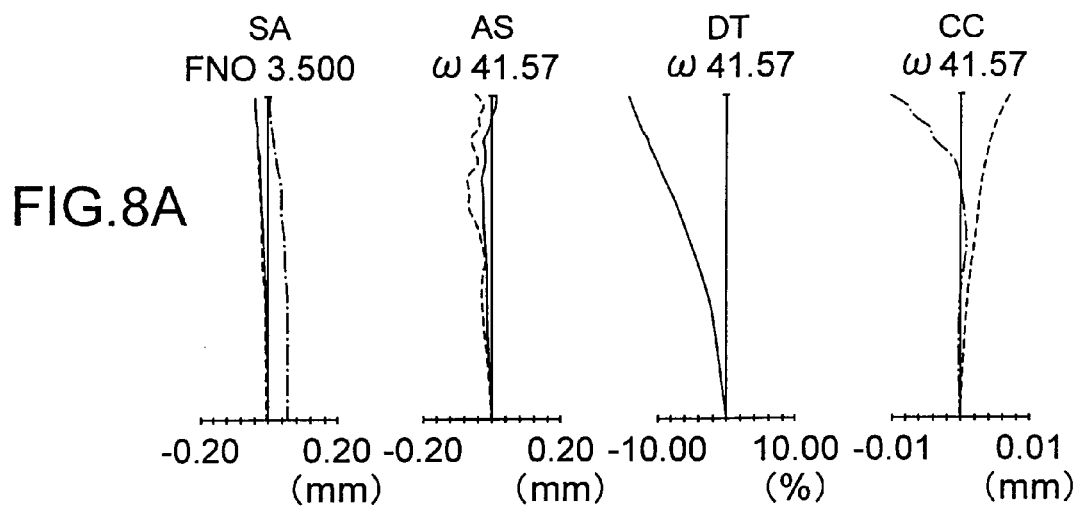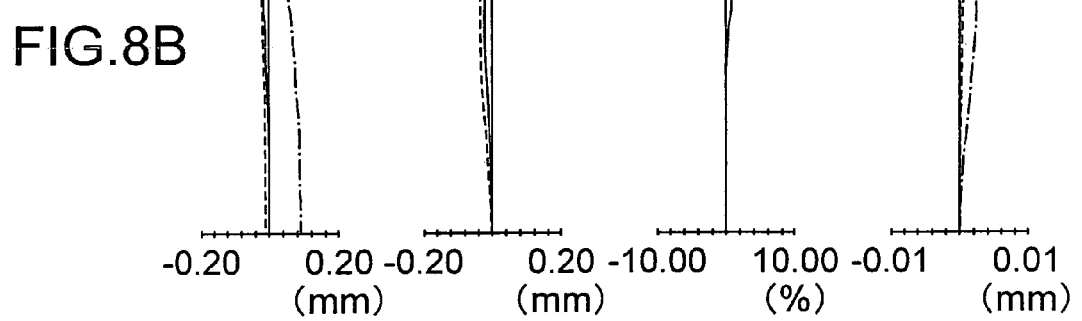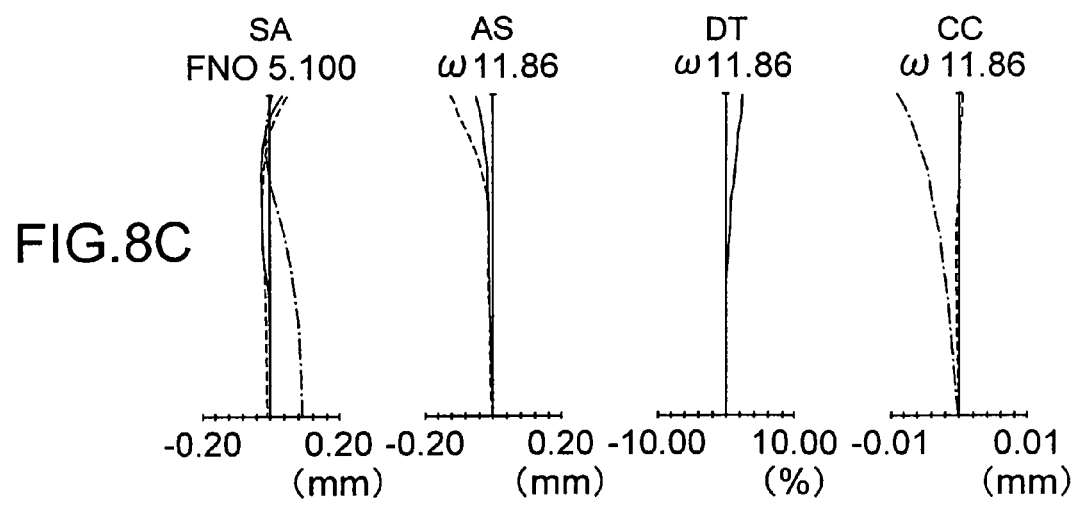

EFECTIVE IMAGE PICKUP AREA   PHOTOELECTRIC CONVERSION SURFACE

RECORDED AND REPRODUCED IMAGE

EFECTIVE IMAGE PICKUP AREA   PHOTOELECTRIC CONVERSION SURFACE

RECORDED AND REPRODUCED IMAGE

EFECTIVE IMAGE PICKUP AREA   PHOTOELECTRIC CONVERSION SURFACE

RECORDED AND REPRODUCED IMAGE

IMAGE PICKUP APPARATUS HAVING WIDE ANGLE ZOOM LENS SYSTEM

CROSS-REFERENCE TO RELATED APPLICATION

The present application is based upon and claims the benefit of priority from the prior Japanese Patent Application Nos. 2007-135900 filed on Mar. 10, 2007, and 2007-130253 filed on Mar. 16, 2007; the entire contents of which are incorporated herein by reference.

BACKGROUND OF THE INVENTION

1. Field of the Invention

The present invention relates to an image pickup apparatus with wide angle zoom lens system having a reflecting surface in an optical path.

2. Description of the Related Art

In recent years, digital cameras in which, an object is photographed by using an image pickup element such as a CCD (Charge Coupled Device) and a CMOS (Complementary Metal-Oxide Semiconductor) have been main stream replacing a silver-salt film camera, and such digital cameras have been used in wide range of categories from a high-function type for professional use to a portable popular type.

Particularly, among the digital cameras of the popular type, small size products, particularly a slim digital camera which can be accommodated easily in a pocket of clothes or a bag, and carried conveniently have been preferred. Moreover, as a taking lens system, a magnification ratio of about 3 for a zoom lens system has been common. It is necessary to make small a size of a zoom lens system compatible with such camera, such that a portability of the camera is not lost.

Moreover, for slimming the camera, it is necessary to slim a lens barrel of the zoom lens system. As a means thereof, a so-called collapsible barrel which is pushed out from an inside of a camera body when the camera is in use, and is accommodated inside the camera body while carrying the camera has been common. On the other hand, an inner zoom type which makes reflect an optical path through roughly 90° by using a reflecting optical member in a lens unit nearest to an object in a zoom lens system, and carries out zooming by using a lens unit closer to an image side than that lens unit has been proposed.

A peculiarity of the inner zoom type is that, a full length of the lens system does not change at the time of zooming. Therefore, since it is possible to make a thickness of a lens barrel in a direction of a thickness of a camera to be about a thickness of a lens nearest to the object side, the slimming of the camera can be carried out easily. Moreover, for making the size small, a zoom lens system of a four unit structure having an arrangement of lenses having a positive, negative, positive, and positive refracting power in order from the object side has been proposed in Japanese Patent Application Laid-open Publication Nos. 2003-302576, 2004-69808, 2004-184627, 2004-347712, and 2006-343622.

Moreover, zoom lens systems of a conventional technology in which, a lens structure has positive, negative, positive, and positive refracting power in order from the object side, a magnification ratio of about 3, and a half-image angle of 35° and more has been disclosed in Japanese Patent Application Laid-open Publication Nos. 2000-131610 and 2006-58363.

SUMMARY OF THE INVENTION

According to an aspect of the present invention, an image pickup apparatus of the present invention includes a zoom lens system, and an image pickup element which is disposed at an image side of the zoom lens system, and which changes an image formed by the zoom lens system, to an electric signal, and the zoom lens system includes in order from an object side thereof a first lens unit having a positive refracting power, a second lens unit having a negative refracting power, a third lens unit having a positive refracting power, a fourth lens unit having a positive refracting power, and an aperture stop which is disposed between the second lens unit and the third lens unit, and zooming is carried out from a wide angle end to a telephoto end by fixing a position of the first lens unit, and changing a distance between the lens units by moving at least the second lens unit and the third lens unit, and in a state at the telephoto end, with respect to a state at the wide angle end, the second lens unit is positioned at the image side, the third lens unit is positioned at the object side, a distance between the second lens unit and the aperture stop is narrowed, and a distance between the aperture stop and the third lens unit is narrowed, and the first lens unit includes in order from the object side thereof a front lens component having a negative refracting power, a reflecting optical member having a reflecting surface which reflects an optical path, and a rear lens component having a positive refracting power, and the zoom lens system satisfies the following conditional expressions.

$$33° < \tan^{-1}(IH_w/f_w) \quad (1)$$

$$3 < f_{1g}/f_w < 5 \quad (2)$$

where, $f_w$ denotes a focal length of the entire zoom lens system, at a wide angle end, $IH_w$ denotes a maximum image height at the wide angle end, and $f_{1g}$ denotes a focal length of the first lens unit.

Moreover, an image pickup apparatus of the present invention includes a zoom lens system, and an image pickup element which is disposed at an image side of the zoom lens system, and which changes an image formed by the zoom lens system, to an electric signal, and the zoom lens system includes in order from an object side thereof a first lens unit having a positive refracting power, a second lens unit having a negative refracting power, a third lens unit having a positive refracting power, a fourth lens unit having a positive refracting power, and an aperture stop which is disposed between the second lens unit and the third lens unit, and zooming is carried out from a wide angle end to a telephoto end by fixing a position of the first lens unit, and changing a distance between the lens units by moving at least the second lens unit and the third lens unit, and in a state at the telephoto end, with respect to a state at the wide angle end, the second lens unit is positioned at the image side, the third lens unit is positioned at the object side, a distance between the second lens unit and the aperture stop is narrowed, and a distance between the aperture stop and the third lens unit is narrowed, and the first lens unit includes in order from the object side thereof a front lens component having a negative refracting power, a reflecting optical member having a reflecting surface which reflects an optical path, and a rear lens component having a positive refracting power, and the second lens unit includes in order form the object side thereof, three lenses namely, a negative lens, a positive lens, and a negative lens, and from among the three lenses, the negative lens nearest to the object side has an aspheric surface.

BRIEF DESCRIPTION OF THE DRAWINGS

FIG. 1A shows a state at a wide angle end, FIG. 1B shows an intermediate state, and FIG. 1C shows a state at a telephoto end;

FIG. 6A shows a state at the wide angle end, FIG. 6B shows an intermediate state, and FIG. 6C shows a state at a telephoto end;

FIG. 7A shows a state at the wide angle end, FIG. 7B shows an intermediate state, and FIG. 7C shows a state at a telephoto end;

FIG. 8A, FIG. 8B, and FIG. 8C are diagrams showing a spherical aberration (SA), an astigmatism (AS), a distortion (DT), and a chromatic aberration of magnification (CC) at the time of the infinite object point focusing, according to the third embodiment, where, FIG. 8A shows a state at the wide angle end, FIG. 8B shows an intermediate state, and FIG. 8C shows a state at a telephoto end;

FIG. 9A shows a state at the wide angle end, FIG. 9B shows an intermediate state, and FIG. 9C shows a state at a telephoto end;

FIG. 10A shows a state at a wide angle end, FIG. 10B shows an intermediate state, and FIG. 10C shows a state at a telephoto end;

DETAILED DESCRIPTION OF THE INVENTION

Figure 1A:
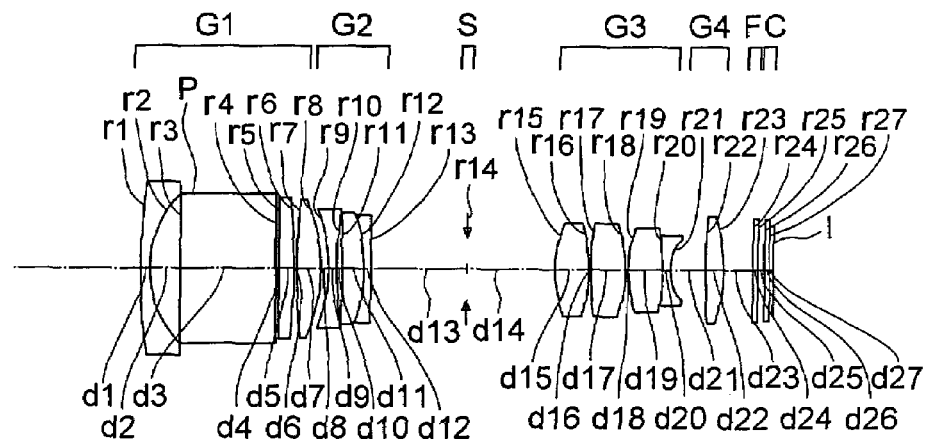
FIG. 1A, FIG. 1B, and FIG. 1C are lens cross-sectional views showing an optical arrangement at the time of infinite object point focusing of a zoom lens system in an image pickup apparatus according to a first embodiment of the present invention, where.

An image pickup apparatus of the present invention includes a zoom lens system, and an image pickup element which is disposed at an image side of the zoom lens system, and which changes an image formed by the zoom lens system, to an electric signal, and the zoom lens system includes in order from an object side thereof a first lens unit having a positive refracting power, a second lens unit having a negative refracting power, a third lens unit having a positive refracting power, a fourth lens unit having a positive refracting power, and an aperture stop which is disposed between the second lens unit and the third lens unit, and a zooming is carried out from a wide angle end to a telephoto end by fixing a position of the first lens unit, and changing a distance between the lens units by moving at least the second lens unit and the third lens unit, and in a state at the telephoto end, with respect to a state at the wide angle end, the second lens unit is positioned at the image side, the third lens unit is positioned at the object side, a distance between the second lens unit and the aperture stop is narrowed, and a distance between the aperture stop and the third lens unit is narrowed, and the first lens unit includes in order from the object side therefore a front lens component having a negative refracting power, a reflecting optical member having a reflecting surface which reflects an optical path, and a rear lens component having a positive refracting power.

When the first lens unit has a reflecting surface and is of an inner zoom type which is fixed at the time of zooming, it is possible to make a size of the lens units sandwiching the aperture stop to be about the same, which is advantageous for making thin a size in a direction of thickness of the image pickup apparatus.

Therefore, an arrangement is made such that the aperture stop is disposed between the second lens unit and the third lens unit, and the second lens unit and the third lens unit come close to the aperture stop at the telephoto end with respect to the wide angle end. In a case of such lens system arrangement, by disposing the first lens unit having the positive refracting power and the second lens unit having the negative refracting power near at the wide angle end, and increasing the distance between the first lens unit and the second lens unit at the telephoto end, the second lens unit is imparted a zooming load.

On the other hand, when an amount of movement of the second lens unit becomes excessively large, since the first lens unit and the second lens unit at the wide angle end are drawn apart excessively from the first lens unit and the second lens unit, it becomes difficult to make small a lens diameter of the first lens unit.

Therefore, when the zoom lens system is made to be such that the third lens unit is positioned at the object side at the telephoto end with respect to the wide angle end in the present invention, since it is possible to make substantial the zooming load of the third lens unit, and to reduce the zooming load of the second lens unit, it is possible to make small an amount of movement of the second lens unit.

Furthermore, the present invention is characterized in that the zoom lens system satisfies conditional expressions (1) and (2) which regulate the refracting power of the first lens unit.

$$33° < \tan^{-1}(IH_w/f_w) \quad (1)$$

$$3 < f_{1g}/f_w < 5 \quad (2)$$

where, $f_w$ denotes a focal length of the entire zoom lens system, at a wide angle end, $IH_w$ denotes a maximum image height at the wide angle end, and $f_{1g}$ denotes a focal length of the first lens unit.

Conditional expression (1) is an expression which regulates a relationship of the maximum image height and a focal length at the wide angle end, and is an expression for making it easy to secure an image angle at the wide angle end. By specifying the focal length and the image height such that the value is not lower than a lower limit value in conditional expression (1), it becomes easy to secure the image angle. Whereas, when the image angle is widened, the first lens unit is susceptible to an increase in the size. Here, by structuring the first lens unit by a front lens component having a negative refracting power, a reflecting optical member having a reflecting surface which reflects the optical path, and a rear lens component having a negative refracting power in order from the object side, it is possible to form a size of the object side from the reflecting surface to be larger, which is advantageous for making small the first lens unit.

Further, by making increasing the refracting power of the first lens unit moderately to satisfy conditional expression (2), it is possible to make it easy to exert a zooming function of the second lens unit while suppressing an occurrence of an aberration at the first lens unit. Moreover, it becomes even more advantageous for making small the amount of movement of the second lens unit, and even when the image angle at the wide angle end is made wide, by making small the lens diameter of the first lens unit, it becomes easy to make small the thickness of the zoom lens system.

When the value is lower than a lower limit value in conditional expression (2), the refracting power of the first lens unit increases excessively, which is advantageous for making small the first lens unit, but a spherical aberration and an astigmatism occur substantially, and an aberration correction of the overall lens system becomes difficult. On the other hand, when the value is higher than an upper limit value in conditional expression (2), the refracting power of the first lens unit becomes excessively weak, and when an attempt is made to impart the zooming load to the second lens unit, the first lens unit is susceptible to become large.

In this manner, the present invention enables to make small a diameter of the first lens unit by devising an idea for making small the amount of movement of the second lens unit even when it is susceptible to widen the image angle. Moreover, since it is possible to make small the amount of movement at the time of zooming of the second lens unit, an aberration fluctuation at the time of zooming is suppressed, which is advantageous for favorable aberration performance in a zoom range.

$IH_w$ is determined by an effective image pickup area at the wide angle end. The effective image pickup area is an area of a photoelectric conversion surface of an image pickup element, on which, an image to be used at the time of recording, displaying, and printing is formed. The effective image pickup area might have a change in the size of the area such as a change of an aspect ratio. In such case, an image height which is the maximum among the image heights which is possible in the effective image pickup area is let to be $IH_w$.

Moreover, a shape of the effective image pickup area in general is rectangular, and a size of the effective image pickup area at the time of zooming from the wide angle end to the telephoto end is constant.

On the other hand, a recording and reproducing of an image might be carried out by carrying out an image processing in which, a distortion of a lens system which occurs at the wide angle side is corrected. The effective image area in a case of correcting the distortion electrically changes according to a degree of correction in the image processing. For example, in a case of recording and reproducing an image by correcting electrically a barrel distortion which occurs at the wide angle end, a shape of the effective image area is a barrel shape. $IH_w$ in this case, similarly as it has been described above, becomes the maximum among the image heights which are possible in the effective image pickup area at the time of wide angle end taking photography.

Moreover, in the front lens component of the first lens unit, a height of incidence of light rays in the wide angle end state increases. Therefore, letting the front lens component of the first lens unit to be one negative lens is even more advantageous for making small a size of a surface of incidence and a direction of thickness of the zoom lens system.

When such an arrangement is adopted, it is preferable that the negative lens of the front lens component satisfies at least one of the following conditional expressions (3), (4), and (5).

$$1.5 < |f_{L1}/f_w| < 3 \quad (3)$$

$$1.85 < N_{L1} \quad (4)$$

$$0.5 < (R_{L1f} + R_{L1r})/(R_{L1f} - R_{L1r}) < 1.5 \quad (5)$$

where, $f_{L1}$ denotes a focal length of the negative lens of the front lens component in the first lens unit, $N_{L1}$ denotes a refractive index of the negative lens of the front lens component in the first lens unit, with respect to a d-line, $R_{L1f}$ denotes a paraxial radius of curvature of a surface on the object side, of the negative lens of the front lens component in the first lens unit, and $R_{L1r}$ denotes a paraxial radius of curvature of a surface on the image side, of the negative lens of the front lens component in the first lens unit.

Conditional expression (3) is an expression for setting appropriately a refracting power of the negative lens in the first lens unit, and is an expression for making it even easier to secure an image angle and to make small the first lens unit by making an entrance pupil shallow, while securing a zooming ratio and optical performance.

By suppressing the refracting power of the negative lens in the first lens unit to a moderate degree by making an arrangement such that the value is not lower than a lower limit value in conditional expression (3), it becomes easy to secure a zooming load of the second lens unit and the third lens unit which follow the first lens unit, and it is advantageous for securing the zooming ratio of the entire system and a reduction in an amount of movement of the second lens unit and the third lens unit. Moreover, the negative lens being away from the aperture stop, an oblique aberration is susceptible to occur for this lens, but by suppressing the refracting power to a moderate degree, it becomes easy to correct an oblique aberration such as distortion and to suppress an occurrence of chromatic aberration. On the other hand, by securing the refracting power of the negative lens in the first lens unit by making an arrangement such that a value is not higher than an upper limit value in conditional expression (3), a function of making the entrance pupil shallow (making a distance from a first lens surface to the entrance pupil short), and is advantageous for both securing the image angle and making small a size of each optical element forming the first lens unit.

Conditional expression (4) is an expression which sets a refractive index of the negative lens in the first lens unit, with respect to d-line, and is an expression for making it more advantageous for both the size reduction and favorable performance. In a case of satisfying conditional expression (1), the image angle becomes wide. However, in such case, normally, for securing the optical performance, a surface on an image side of the negative lens nearest to the object side is susceptible to be a concave surface. In that case, the negative lens is susceptible to be protruded toward the object side, and the size of the first lens unit is susceptible to increase. By making an arrangement such that a value is not lower than a lower limit value in conditional expression (4), it is possible to suppress a curvature of a lens surface while securing a negative refracting power of the negative lens. Accordingly, a distance on the optical axis, between the negative lens and a reflecting optical member becomes short, and it becomes easy to carry out both a size reduction of the first lens unit (slimming of the image pickup apparatus), and securing the optical performance.

Conditional expression (5) is an expression which sets a shape of the negative lens in the first lens unit, and is an expression for making it more advantageous for both the size reduction and favorable performance. By making an arrangement such that a value is not lower than a lower limit value in conditional expression (5), it becomes easy to suppress an angle of incidence of off-axis light rays with respect to a surface on the object side of the negative lens, and it is advantageous for correction of the oblique (off-axis) aberration. By making an arrangement such that a value is not higher than an upper limit value in conditional expression (5), it becomes easy to suppress protruding a vertex of a lens surface, which is advantageous for the size reduction. Moreover, it becomes easy to suppress an occurrence of a spherical aberration of the negative lens at the telephoto side.

Moreover, it is preferable that the following conditional expression (6) is satisfied by the zoom lens system of the present invention.

$$0.8 < mg_{2z}/mg_{3z} < 1.5 \quad (6)$$

where, $mg_{2z}$ denotes a ratio of magnification of the telephoto end with respect to a magnification of the wide angle end of the second lens unit, and $mg_{3z}$ denotes a ratio of magnification of the telephoto end with respect to a magnification of the wide angle end of the third lens unit.

Conditional expression (6) is an expression which sets a zooming load of the second lens unit and the third lens unit. Moreover, conditional expression (6) is a condition which is even more advantageous for size reduction while securing the zooming ratio. By making an arrangement such that a value is not higher than an upper limit value in conditional expression (6), the zooming load of the second lens unit is suppressed, the amount of movement of the second lens unit is made small, and it is advantageous for reducing a diameter of the first lens unit. By making an arrangement such that a value is not lower than a lower limit value in conditional expression (6), it is easy to suppress the zooming load of the third lens unit, and to suppress an increase in an overall length which is due to an increase in the amount of movement of the third lens unit.

Moreover, in the zoom lens system of the present invention, it is preferable to fix a position of the aperture stop at the time of zooming, to move the fourth lens unit at the time of zooming, and to make a length in a direction of an optical axis in which, the fourth lens unit moves shorter than a length in the direction of the optical axis in which the second lens unit and the third lens unit move. By fixing the position of the aperture stop, it is easy to make a drive mechanism simple, rather than moving the aperture stop independently. Moreover, moving the fourth lens unit at the time of zooming is advantageous for an adjustment of a shift in an image position and an adjustment of an exit pupil position. By making small the amount of movement of the fourth lens unit, it becomes easy to simplify a mechanism which drives the fourth lens unit.

Moreover, in the zoom lens system of the present invention, when an arrangement is let to be such that a focusing from a long-distance object point to a short-distance object point is carried out by moving the fourth lens unit toward the object side, it is possible to make small a fluctuation in the oblique aberration when it is focused to a short-distance object point.

In a case of having a focusing mechanism, all values to be used in each conditional expressions mentioned above are values in a state of being focused to a longest distance object point. It is more preferable that the plurality of abovementioned arrangements combined and plurality of conditional expressions are satisfied simultaneously, from a point of size reduction, securing of the zooming ratio, securing of the image angle, and securing of the optical performance.

It is preferable to make the following arrangements in each conditional expression mentioned above.

It is preferable to let a lower limit value in conditional expression (1) to be 35°, and a lower limit value 36.5° is more preferable.

It is preferable to provide an upper limit value in conditional expression (1), and it is preferable that the upper limit value is not higher than 50°, and an upper limit value not higher than 45° is more preferable. This is advantageous for suppressing the occurrence of the extreme distortion, while maintaining the small size of the zoom lens system.

It is preferable to let a lower limit value in conditional expression (2) to be 3.2, and a lower limit value of 3.3 is more preferable.

It is preferable to let an upper limit value in conditional expression (2) to be 4.5, and an upper limit value of 4.0 is more preferable.

It is preferable to let a lower limit value in conditional expression (3) to be 1.7, and a lower limit value of 1.9 is more preferable.

It is preferable to let an upper limit value in conditional expression (3) to be 1.9, and an upper limit value of 1.0 is more preferable.

It is preferable to let a lower limit value in conditional expression (4) to be 1.9, and a lower limit value of 2.0 is more preferable.

It is preferable to provide an upper limit value in conditional expression (4), and it is preferable that the upper limit value is not higher than 2.5, and an upper limit value not higher than 2.3 is more preferable. This is advantageous for reducing a material cost.

It is preferable to let a lower limit value in conditional expression (5) to be 0.7, and a lower limit value of 0.9 is more preferable.

It is preferable to let an upper limit value in conditional expression (5) to be 1.4, and an upper limit value of 1.35 is more preferable.

It is preferable to let a lower limit value in conditional expression (6) to be 0.9, and a lower limit value of 1.0 is more preferable.

It is preferable to let an upper limit value in conditional expression (6) to be 1.3, and an upper limit value of 1.2 is more preferable.

It is preferable that each invention described above satisfies arbitrarily, a plurality of conditional expressions simultaneously. Moreover, regarding each conditional expression, only an upper limit value and a lower limit value in a range of numerical values of the further restricted conditional expressions may be restricted. Moreover, various structures described above may be combined arbitrarily.

An image pickup apparatus having a wide angle zoom lens system according to the present invention includes a zoom lens system, and an image pickup element which is disposed at an image side of the zoom lens system, and which changes an image formed by the zoom lens system, and the zoom lens system includes in order from an object side thereof, a first lens unit having a positive refracting power, a second lens unit having a negative refracting power, a third lens unit having a positive refracting power, a fourth lens unit having a positive refracting power, and an aperture stop which is disposed between the second lens unit and the third lens unit, and zooming is carried out from a wide angle end to a telephoto end by fixing a position of the first lens unit, and changing a distance between the lens units by moving at least the second lens unit and the third lens unit, and in a state at the telephoto end, with respect to a state at the wide angle end, the second lens unit is positioned at the image side, the third lens unit is positioned at the object side, a distance between the second lens unit and the aperture stop is narrowed, and a distance between the aperture stop and the third lens unit is narrowed, and the first lens unit includes in order from the object side thereof a front lens component having a negative refracting power, a reflecting optical member having a reflecting surface which reflects an optical path, and a rear lens component having a positive refracting power.

When the first lens unit has a reflecting surface and is of an inner zoom type which is fixed at the time of zooming, it is possible to make a size of the lens unit sandwiching the aperture stop to be about the same, which is advantageous for making thin a size in a direction of thickness of the image pickup apparatus.

Therefore, the structure is made such that the aperture stop is disposed between the second lens unit and the third lens unit, and the second lens unit and the third lens unit come close to the aperture stop at the telephoto end with respect to the wide angle end. In a case of such lens system arrangement, by disposing the first lens unit having the positive refracting power and the second lens unit having the negative refracting power near at the wide angle end, and increasing the distance between the first lens unit and the second lens unit at the telephoto end, the second lens unit is imparted a zooming On the other hand, when an amount of movement of the second lens unit becomes excessively large, since the first lens unit and the second lens unit at the wide angle end are drawn apart excessively from the first lens unit and the second lens unit, it becomes difficult to make small a lens diameter of the first lens unit.

Therefore, when the zoom lens system is made to be such that the third lens unit is positioned at the object side at the telephoto end with respect to the wide angle end in the present invention, since it is possible to make substantial the zooming load of the third lens unit, and to reduce the zooming load of the second lens unit, it is possible to make small an amount of movement of the second lens unit.

Moreover, to achieve a favorable aberration performance even when the image angle at the wide angle end is widened in the present invention, the second lens unit is arranged to include a negative lens, a positive lens and, and negative lens in order from the object side.

The second lens unit is a lens unit having a negative refracting power. Therefore, when the second lens unit is structured by two lenses namely a negative lens and a positive lens as in the conventional technology, a power of the negative lens becomes excessively strong relatively, and due to widening of the angle, when an attempt is made to secure a negative refracting power of the second lens unit, it becomes difficult to secure an oblique (off-axis) aberration performance at the wide angle end.

Therefore, in an arrangement of the present invention, the negative refracting power is divided into the two negative lenses, and reduction in an aberration occurrence for each negative lens is made possible. Moreover, an arrangement of the second lens unit is let to be a negative lens, a positive lens, and a negative lens in order from the object side. Accordingly, symmetry of the lens arrangement is improved, and an efficient aberration correction in the second lens unit is made possible.

Moreover, for achieving a favorable optical performance by suppressing even further the occurrence of aberration in the second lens unit, by using at least one aspheric surface in the negative lens nearest to the object side in the second lens unit, it is possible to suppress the occurrence of a spherical aberration and a coma aberration to be small.

Furthermore, it is preferable that the zoom lens system satisfies the following conditional expression.

$$-1.5 < (R_{2n1f} + R_{2n1r})/(R_{2n1f} - R_{2n1r}) < 0 \quad (A)$$

where, $R_{2n1f}$ is a paraxial radius of curvature of a surface on the object side, of the negative lens nearest to the object side in the second lens unit, and $R_{2n1r}$ is a paraxial radius of curvature of a surface on an image side, of the negative lens nearest to the object side in the second lens unit.

Conditional expression (A) is an expression which specifies a shape of the negative lens nearest to the object side in the second lens unit. By satisfying conditional expression (A), it is has been made possible to hold a favorable aberration performance while securing a power which is necessary even when an image angle at the wide angle end is widened.

By making an arrangement that a value is not higher than an upper limit value in conditional expression (A), principal points of the second lens unit are not let to be disposed toward the object side, and it is possible to make small a position of an entrance pupil of the overall lens system, which is advantageous for making small the lens diameter of the first lens unit. On the other hand, by suppressing a curvature of surface of the negative lens toward the object side by making an arrangement that a value is not lower than a lower limit value in conditional expression (A), a correction of an image plane curvature at the wide angle end becomes easy.

It is preferable to make the following arrangement in each conditional expression mentioned above.

It is preferable to let a lower limit value in conditional expression (A) to be −1.3, and a lower limit value of −1.1 is more preferable.

It is preferable to let an upper limit value in conditional expression (A) to be −0.1, and an upper limit value of −0.2 to more preferable.

The exemplary embodiments of a zoom lens system and an image pickup apparatus according to the present invention will be described below in detail by referring to the accompanying diagrams. However, the present invention is not restricted to the embodiments described below.

Embodiments from a first embodiment to a fifth embodiment are embodiments of an image pickup apparatus with a zoom lens system having a zooming ratio of about 3.5, a half image angle ω at a wide angle end of 40° and more, and having a high performance which can also be used as an optical system for an image pickup element of a latest small pixel pitch, and which is a thin wide angle zoom lens system with a superior compactness.

In the embodiments from the first embodiment to the fifth embodiment, an effective image pickup area in a full-zoom state is rectangular and constant.

Although a position of a reflecting surface has been omitted in lens data, the reflecting surface is positioned between a third surface and a fourth surface, and the reflecting plane surface is tilted 45° with respect to an optical axis to allow the optical axis to be reflected by 90° (refer to an arrangement diagram of a reflecting optical member of a digital camera which will be described later). A reflecting optical member is let to be a rectangular prism in all the embodiments. As a matter of course, the reflecting optical member may be a front surface mirror or a reflecting curved surface, and may be an object of which, a shape of a reflecting surface changes. Moreover, an arrangement may be made such that, a surface of incidence, and a surface of emergence as in the second embodiment are imparted a refracting power.

Corresponding values in conditional expressions for each zoom lens system are values when focused to an infinite object point. The overall length is a length in which, a back focus is added to an optical axial distance from a surface of incidence to a surface of emergence of a lens. The back focus is indicated by an air-conversion distance.

In the first embodiment, the third embodiment, the fourth embodiment, and the fifth embodiment, a rectangular prism which does not have a power is used as the reflecting optical member. Moreover, in the second embodiment, an object in which a planoconvex lens and a rectangular prism which does not have a power are cemented is used as the reflecting optical member.

Focusing is carried out by moving a fourth lens, and a focusing operation from a long-distance object point to a short-distance object point is carried out by moving a fourth lens unit toward an object side.

Embodiments from a sixth embodiment to a tenth embodiment, are examples in which, zoom lens systems in the embodiments from the first embodiment to the fifth embodiment respectively are used, and image pickup apparatuses which correct the distortion electrically are used, and in which, a shape of the effective image pickup area changes. Therefore, the embodiments from the sixth embodiment to the tenth embodiment differ from embodiments in which the image height and the image angle in a zooming state correspond. It is an image pickup apparatus having a zoom lens system in which, a half image angle ω at the wide angle end is 35° or more. In the embodiments from the sixth embodiment to the tenth embodiment, a recording and display of an image is carried out upon correcting electrically a barrel distortion occurring at the wide angle side, and a pin-cushion distortion occurring at a telephoto side.

Figure 11A:
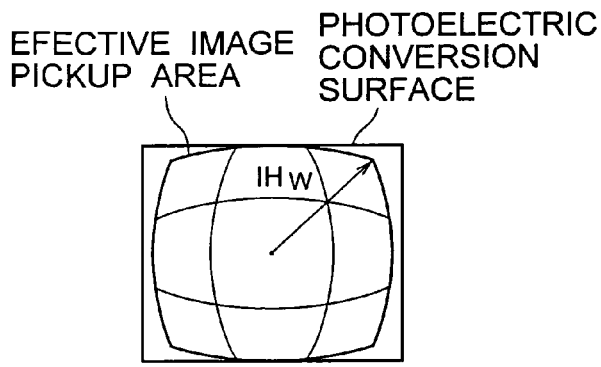
FIG. 11 is a diagram describing a concept of correction of a distortion.
Figure 11B:
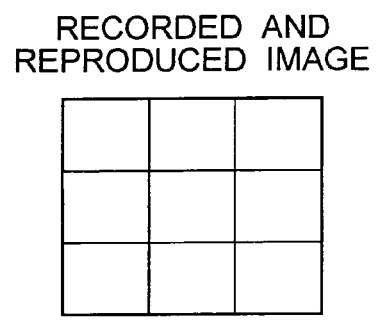
Figure 11C:
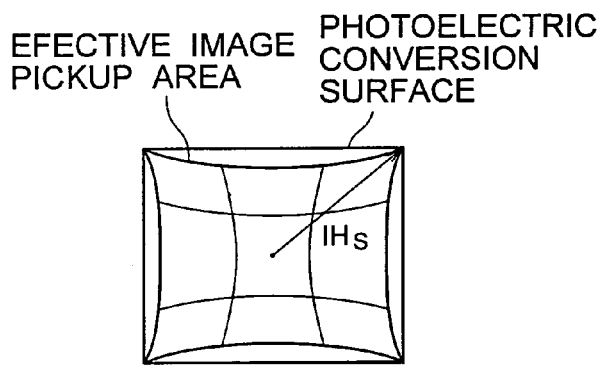
Figure 11D:
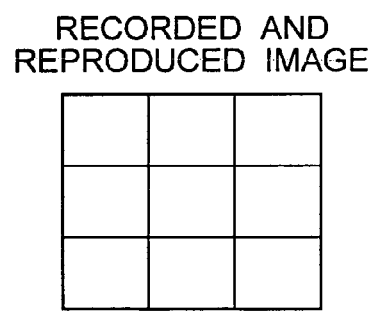
Figure 11E:
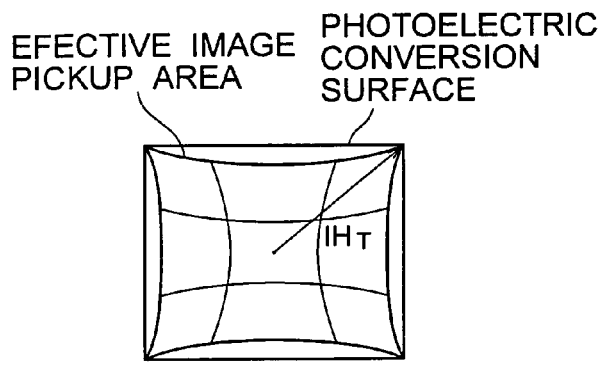

The distortion correction will be described conceptually by referring to FIG. 11A to FIG. 11F. FIG. 11A is a diagram showing a relationship of a distorted state of an image and a photoelectric conversion surface near the wide angle end, and the effective image pickup area. FIG. 11C is a diagram showing a relationship of a distorted state of an image and a photoelectric conversion surface near an intermediate focal length, and the effective image pickup area. FIG. 11E is a diagram showing a relationship of a distorted state of an image and a photoelectric conversion surface near the telephoto end, and the effective image pickup area.

In the zoom lens system of the present invention, a barrel distortion as in FIG. 11A occurs at the wide angle end on a rectangular photoelectric conversion surface. Whereas, near the intermediate focal length state and at the telephoto end, a pin-cushion distortion as in FIG. 11C and FIG. 11E occurs. The diagrams are drawn exaggerating the distorted state for purpose of illustration.

Figure 11F:
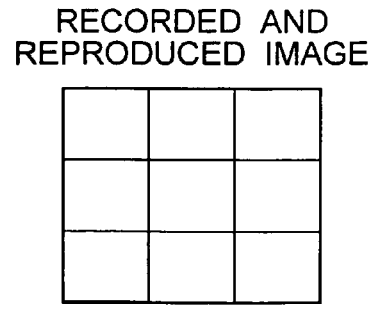

For correcting electrically the distortion, an arrangement is made such that, the effective image area has the barrel shape at the wide angle end, and the pin-cushion shape at the intermediate focal length state and the telephoto end. Moreover, the effective image pickup area which is set in advance is subjected to image conversion by image processing, and is converted to image information of a rectangular type in which, the distortion is reduced. FIG. 11B, FIG. 11D, and FIG. 11F show rectangular shaped image information in which the distortion is reduced at the wide angle end, the intermediate focal length state, and the telephoto end respectively.

An arrangement is made such that the maximum image height $IH_w$ at the wide angle end is smaller than the maximum image height $IH_s$ in the intermediate focal length state, and the maximum image height $IH_t$ at the telephoto end. In an example in FIG. 11A, an arrangement is made such that, a length in a direction of a short side of the photoelectric conversion surface at the wide angle end is same as a length in a direction of a short side of the effective image pickup area. However, an arrangement may be made to record and reproduce an image which is converted to a rectangular shape with a barrel-shaped area smaller than this as the effective image pickup area.

The embodiments from the first embodiment to the fifth embodiment of the zoom lens system of the present invention will be described below. Lens cross-sectional surface at the wide angle end (FIG. 1A, FIG. 2A, FIG. 3A, FIG. 4A, and FIG. 5A), at the intermediate focal length state (FIG. 1B, FIG. 2B, FIG. 3B, FIG. 4B, and FIG. 5B), and at the telephoto end (FIG. 1C, FIG. 2C, FIG. 3C, FIG. 4C, and FIG. 5C) respectively at the time of infinite object point focusing of the embodiments from the first embodiment to the fifth embodiment are shown in FIG. 1A to FIG. 5C. In FIG. 1A to FIG. 5C, G1 denotes a first lens unit, G2 denotes a second lens unit, S denotes an aperture stop, G3 denotes a third lens unit, G4 denotes a fourth lens unit, G5 denotes a fifth lens unit, F denotes a parallel flat plate which forms a low pass filter in which, a wavelength region (band) restricting coating which restricts infrared light is applied, C denotes a parallel flat plate of carbon glass of an electronic image pickup element, and I denotes an image plane. A multilayered film for restricting a wavelength region may be applied to a surface of the carbon glass C. Moreover, the carbon glass C may be let to have an effect of a low pass filter.

Moreover, each numerical data is data in a state when focused at an object at infinity. A unit of length for each value is mm, and a unit of angle is degrees (°). As it has been mentioned above, focusing is carried out by moving a lens unit nearest to the image side. Further, zoom data are values at a wide angle end (WE), at an intermediate focal length state (ST), and at a telephoto end (TE).

Each embodiment described below is a zoom lens system which is suitable for a video camera or an electronic still camera in which an image pickup element such as a CCD and a CMOS is used. Each of these zoom lens systems has a zooming ratio of about 3.5, and a half image angle at the wide angle end of 35° and more.

Figure 1B:
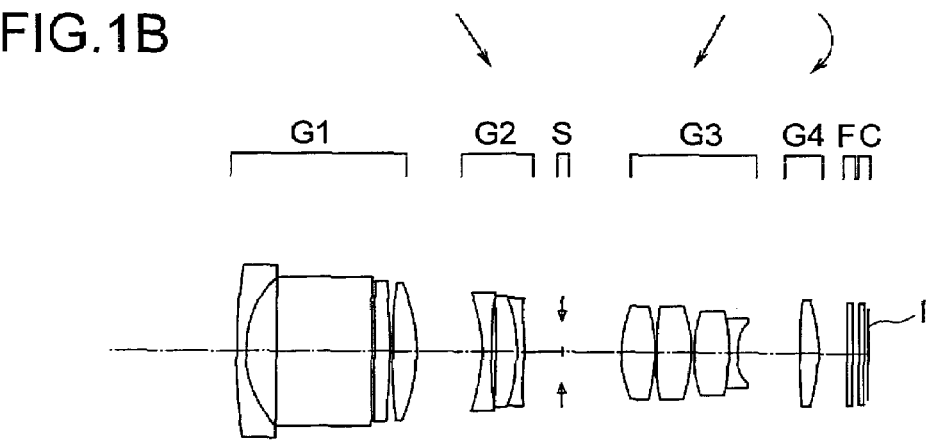
Figure 1C:
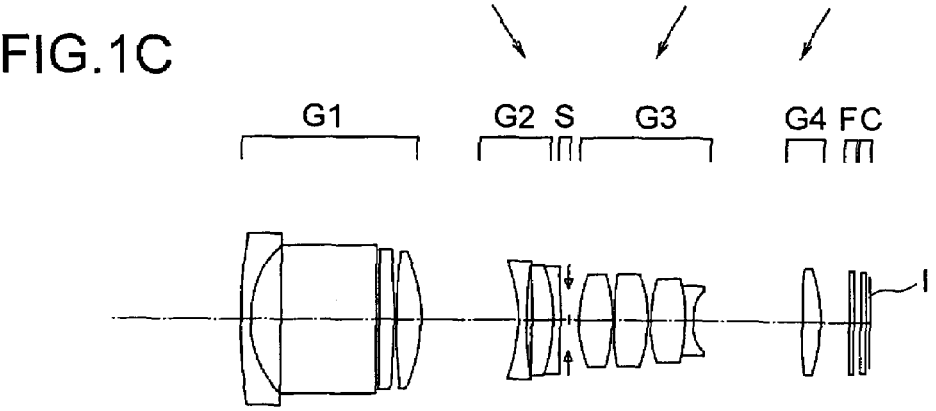

A zoom lens system in the first embodiment, as shown in FIG. 1A to FIG. 1C, includes in order from an object side thereof, a first lens unit G1 having a positive refracting power, a second lens unit G2 having a negative refracting power, an aperture stop S, a third lens unit G3 having a positive refracting power, a fourth lens unit G4 having a positive refracting power.

At the time of zooming from the wide angle end to the telephoto end, the first lens unit G1 is fixed, the second lens unit G2 moves toward the image side, the third lens unit G3 moves toward the object side, and the fourth lens unit G4 moves in a convex locus toward the image side. Moreover, the aperture stop S is fixed, and an amount of light is adjusted by changing an aperture size.

In order from the object side, the first lens unit G1 includes a negative meniscus lens having a convex surface directed toward the object side, an optical path bending prism P, a biconvex positive lens, and a biconvex positive lens. The second lens unit G2 includes a biconcave negative lens and a cemented lens of a biconvex positive lens and a negative meniscus lens having a convex surface directed toward the image side. The third lens unit G3 includes a biconvex positive lens, a biconvex positive lens, and a cemented lens of a biconvex positive lens and a biconcave negative lens. The fourth lens unit G4 includes a biconvex positive lens.

An aspheric surface is used for seven surfaces namely, both surfaces of the second biconvex positive lens from the object side in the first lens unit G1, both surfaces of the biconcave negative lens in the second lens unit G2, both surfaces of the biconvex positive lens nearest to the object side in the third lens unit G3, and a surface on the image side of the biconvex positive lens in the fourth lens unit G4.

Figure 2A:
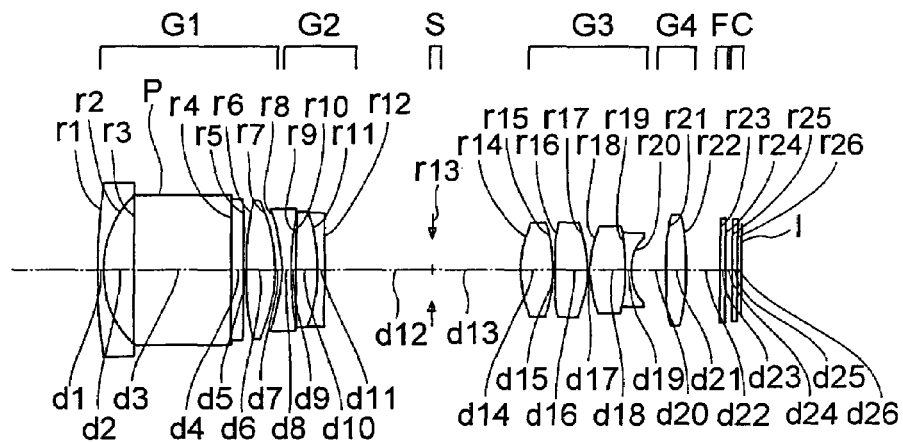
FIG. 2A, FIG. 2B, and FIG. 2C are diagrams similar to FIG. 1A, FIG. 1B, and FIG. 1C respectively, of a zoom lens system in an image pickup apparatus according to a second embodiment of the present invention.
Figure 2B:
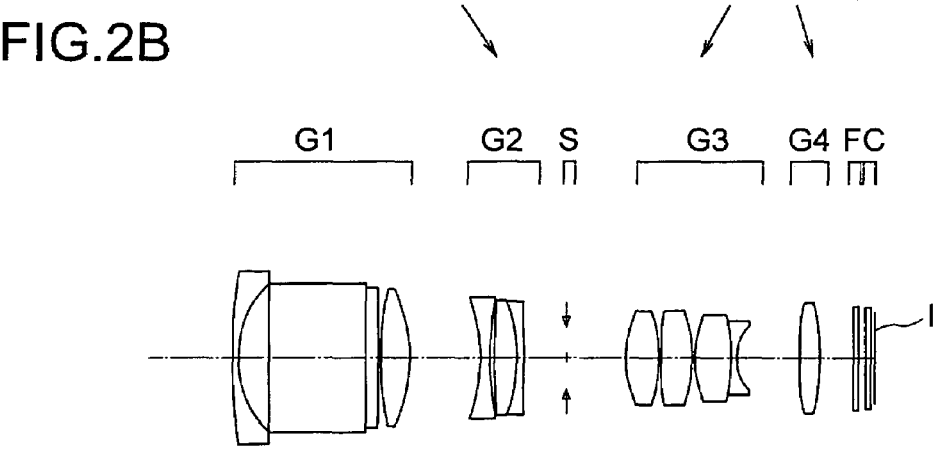
Figure 2C:
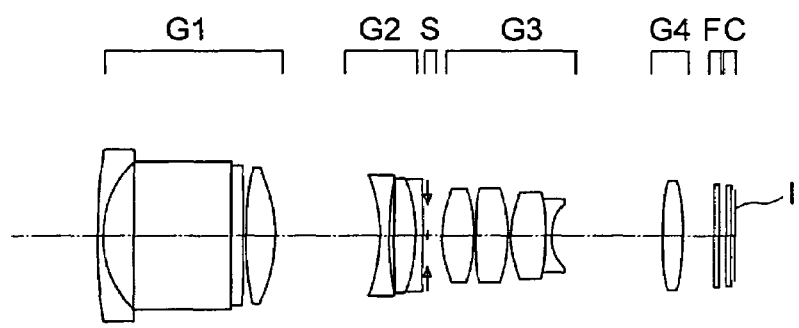

A zoom lens system in the second embodiment, as shown in FIG. 2A to FIG. 2C includes, in order from the object side thereof, a first lens unit G1 having a positive refracting power, a second lens unit G2 having a negative refracting power, an aperture stop S, a third lens unit G3 having a positive refracting power, and a fourth lens unit G4 having a positive refracting power.

At the time of zooming from the wide angle end to the telephoto end, the first lens unit G1 is fixed, the second lens unit G2 moves toward the image side, the third lens unit G3 moves toward the object side, and the fourth lens unit G4 moves toward the image side. Moreover, the aperture stop S is fixed, and an amount of light is adjusted by changing an aperture size.

In order from the object side, the first lens unit G1 includes a negative meniscus lens having a convex surface directed toward the object side, and a cemented lens of an optical path bending prism P and a planoconvex positive lens, and a biconvex positive lens. The second lens unit G2 includes a biconcave negative lens, a biconvex positive lens, and a negative meniscus lens having a convex surface directed toward the image side. The third lens unit G3 includes a biconvex positive lens, a biconvex positive lens, and a cemented lens of a biconvex positive lens and a biconcave negative lens. The fourth lens unit includes a biconvex positive lens.

An aspheric surface is used for seven surfaces namely, both surfaces of the biconvex positive lens in the first lens unit G1, both surfaces of the biconcave negative lens in the second lens unit G2, both surfaces of the biconvex positive lens nearest to the object side in the third lens unit G3, and a surface on the image side of the biconvex positive lens in the fourth lens unit G4.

Figure 3A:
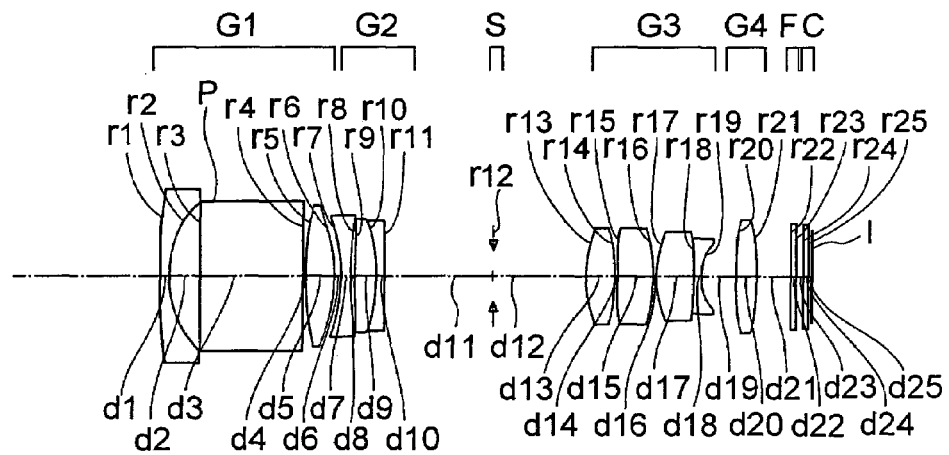
FIG. 3A, FIG. 3B, and FIG. 3C are diagrams similar to FIG. 1A, FIG. 1B, and FIG. 1C respectively, of a zoom lens system in an image pickup apparatus according to a third embodiment of the present invention.
Figure 3B:
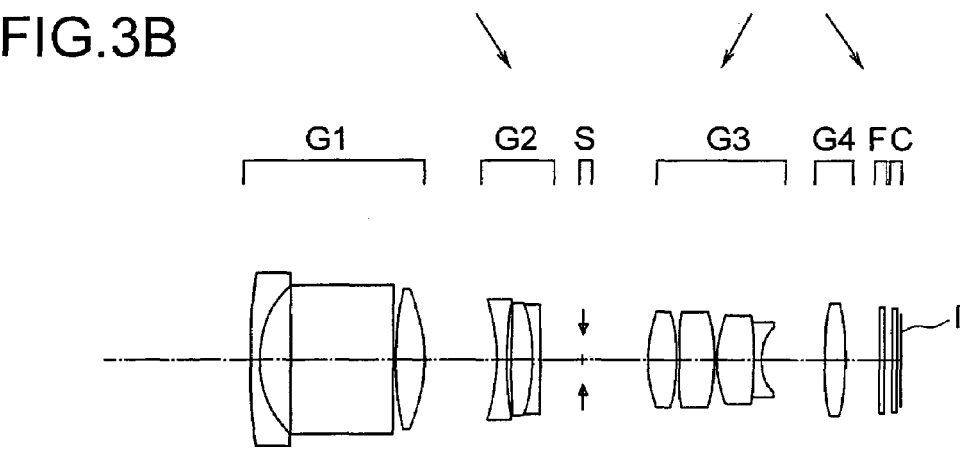
Figure 3C:
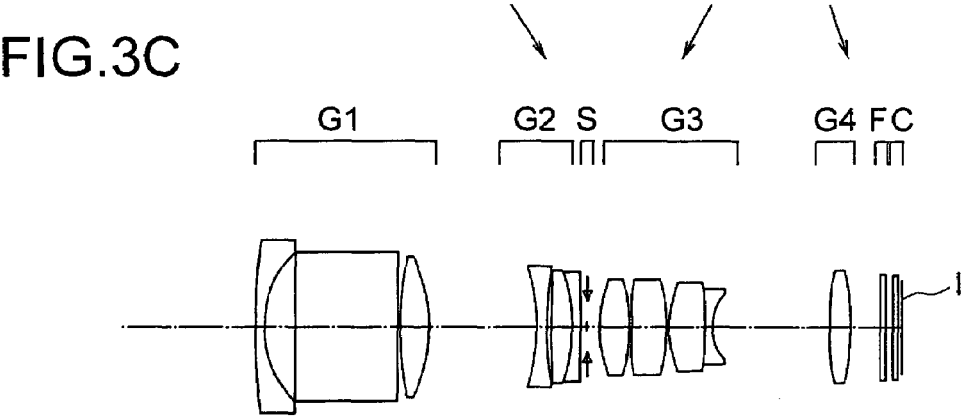

A zoom lens system in the third embodiment, as shown in FIG. 3A to FIG. 3C includes, in order from the object side thereof, a first lens unit G1 having a positive refracting power, a second lens unit G2 having a negative refracting power, an aperture stop S, a third lens unit G3 having a positive refracting power, and a fourth lens unit G4 having a positive refracting power.

At the time of zooming from the wide angle end to the telephoto end, the first lens unit G1 is fixed, the second lens unit G2 moves toward the image side, the third lens unit G3 moves toward the object side, and the fourth lens unit G4 moves toward the image side. Moreover, the aperture stop S is fixed, and an amount of light is adjusted by changing an aperture size.

In order from the object side, the first lens unit G1 includes a negative meniscus lens having a convex surfaced directed toward the object side, an optical path bending prism P, and a biconvex positive lens. The second lens unit G2 includes a biconcave negative lens, and a cemented lens of a biconvex positive lens and a negative meniscus lens having a convex surfaced directed toward the image side. The third lens unit G3 includes a biconvex positive lens, a biconvex positive lens, and a cemented lens of a biconvex positive lens, and a biconcave negative lens. The fourth lens unit G4 includes a biconvex positive lens.

An aspheric surface is used for seven surfaces namely, both surfaces of the biconvex positive lens in the first lens unit G1, both surfaces of the biconcave negative lens in the second lens unit G2, both surfaces of the biconvex positive lens nearest to the object side in the third lens unit G3, and a surface on the image side of the biconvex positive lens in the fourth lens unit G4.

Figure 4A:
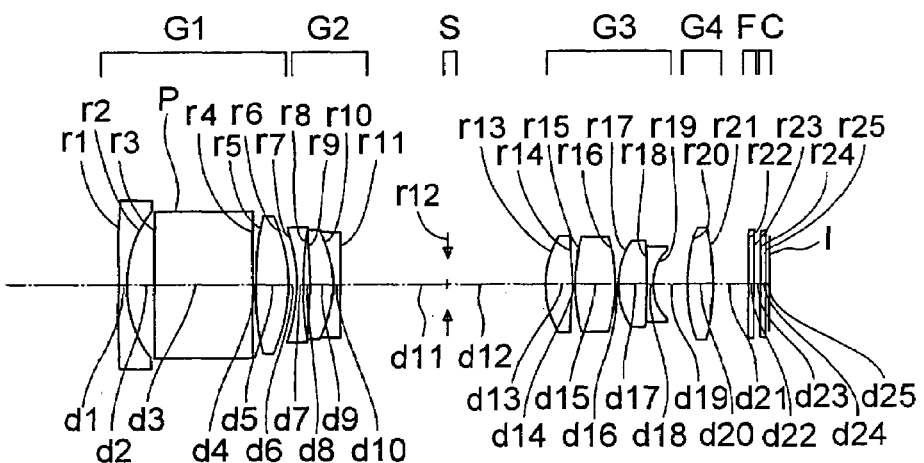
FIG. 4A, FIG. 4B, and FIG. 4C are diagrams similar to FIG. 1A, FIG. 1B, and FIG. 1C respectively, of a zoom lens system in an image pickup apparatus according to a fourth embodiment of the present invention.
Figure 4B:
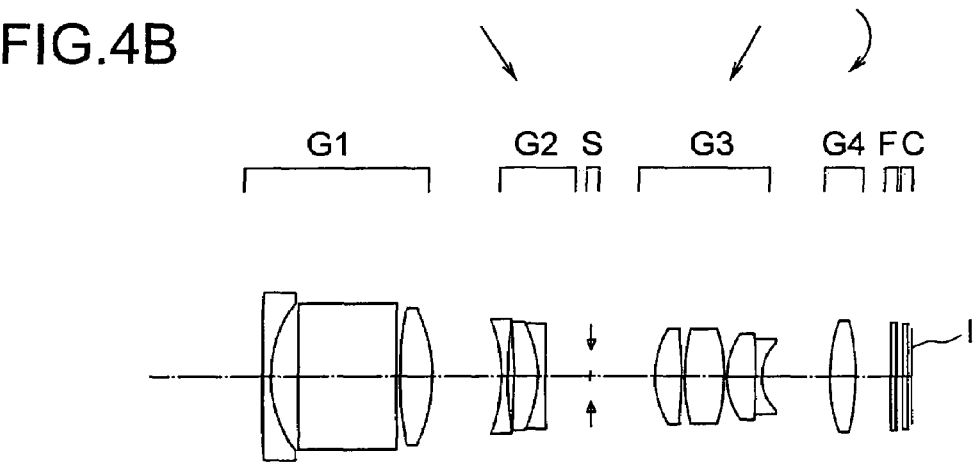
Figure 4C:
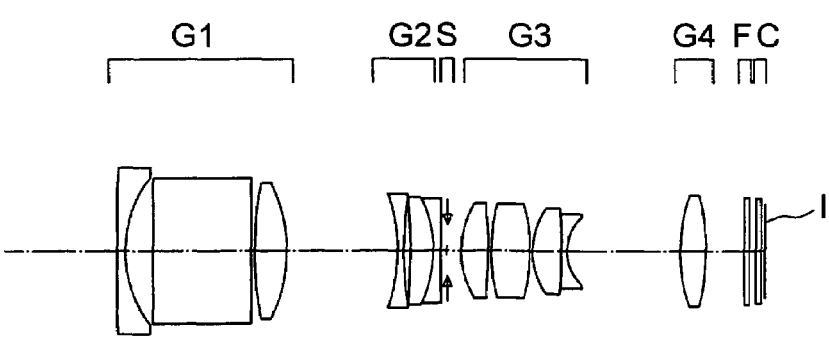

A zoom lens system in the fourth embodiment, as shown in FIG. 4A to FIG. 4C includes, in order from the object side thereof, a first lens unit G1 having a positive refracting power, a second lens unit G2 having a negative refracting power, an aperture stop S, a third lens unit G3 having a positive refracting power, and a fourth lens unit G4 having a positive refracting power.

At the time of zooming from the wide angle end to the telephoto end, the first lens unit G1 is fixed, the second lens unit G2 moves toward the image side, the third lens unit G3 moves toward the object side, and the fourth lens unit G4 moves in a convex locus toward the image side. Moreover, the aperture stop S is fixed, and an amount of light is adjusted by changing an aperture size.

In order from the object side, the first lens unit G1 includes a biconcave negative lens, an optical path bending prism P, and a biconvex positive lens. The second lens unit G2 includes a biconcave negative lens, and a cemented lens of a positive meniscus lens having a convex surface directed toward the image side and a biconcave negative lens. The third lens unit G3 includes a biconvex positive lens, a biconvex positive lens, and a cemented lens of a biconvex positive lens and a biconcave negative lens. The fourth lens unit G4 includes a biconvex positive lens.

An aspheric surface is used for seven surfaces namely, both surfaces of the biconvex positive lens in the first lens unit G1, both surfaces of the biconcave negative lens in the second lens unit G2, both surfaces of the biconvex positive lens nearest to the object side in the third lens unit G3, and a surface on the image side of the biconvex positive lens in the fourth lens unit G4.

Figure 5A:
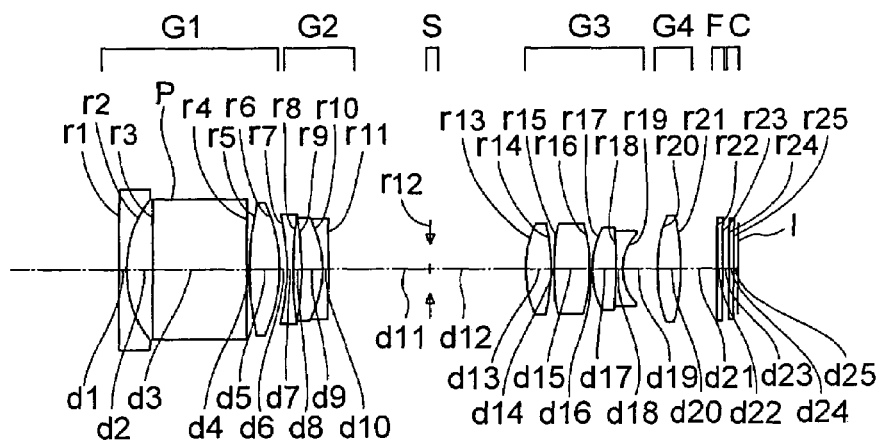
FIG. 5A, FIG. 5B, and FIG. 5C are diagrams similar to FIG. 1A, FIG. 1B, and FIG. 1C respectively, of a zoom lens system in an image pickup apparatus according to a fifth embodiment of the present invention.
Figure 5B:
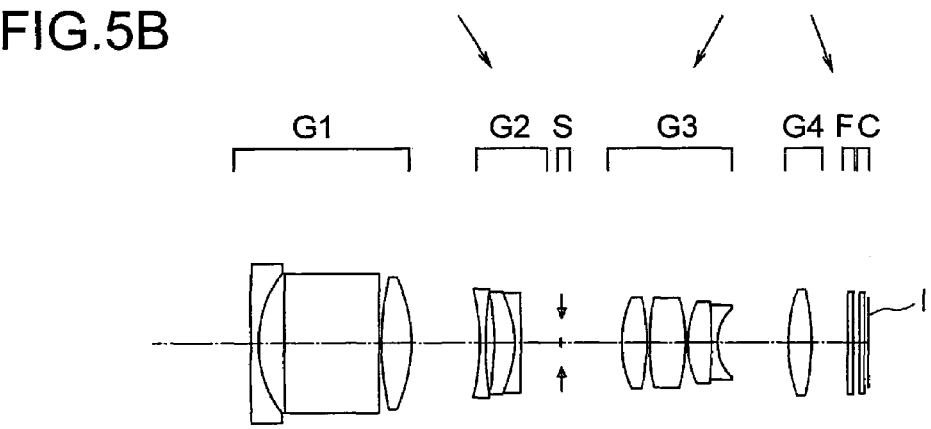
Figure 5C:
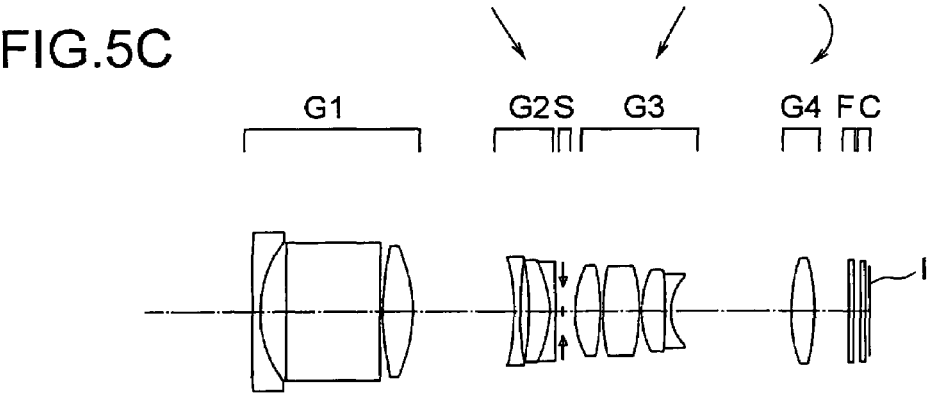
Figure 6A:
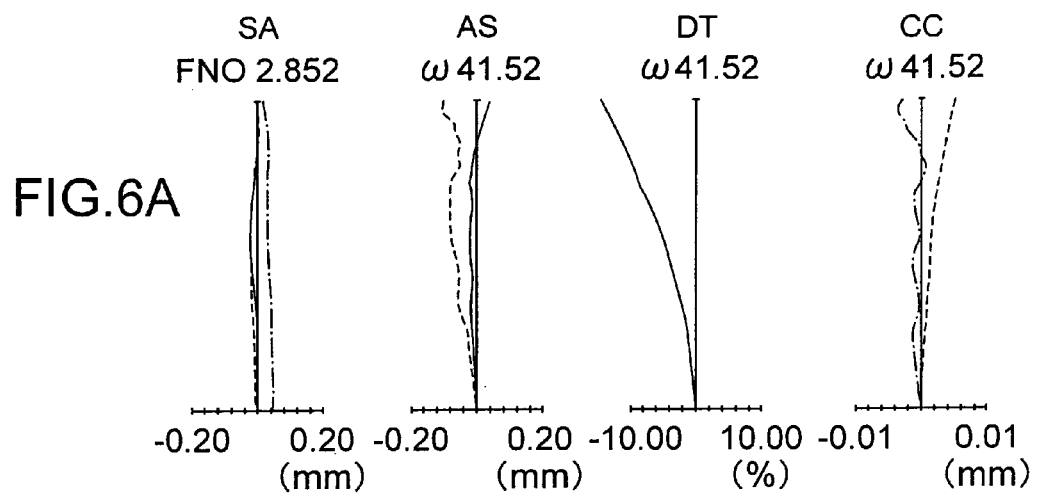
FIG. 6A, FIG. 6B, and FIG. 6C are diagrams showing a spherical aberration (SA), an astigmatism (AS), a distortion (DT), and a chromatic aberration of magnification (CC) at the time of the infinite object point focusing, according to the first embodiment, where.
Figure 6B:
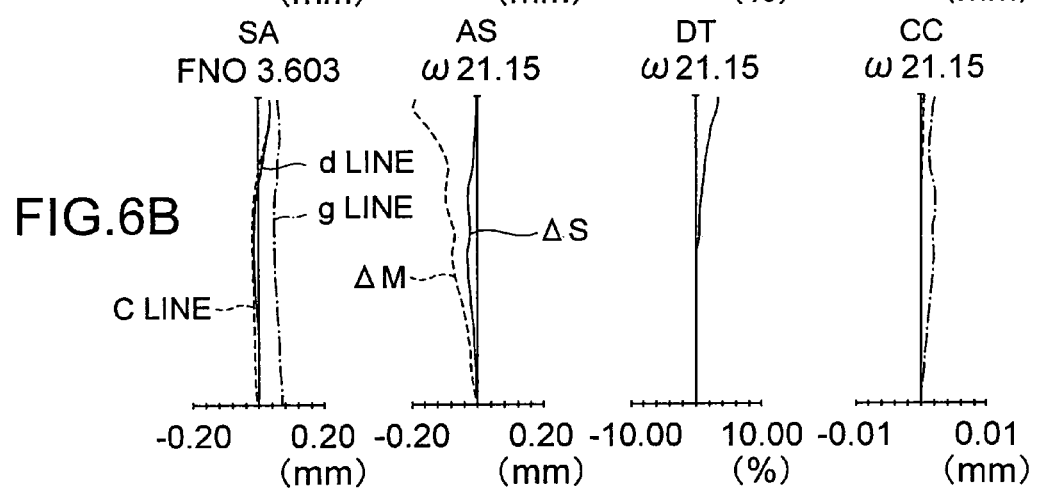
Figure 6C:
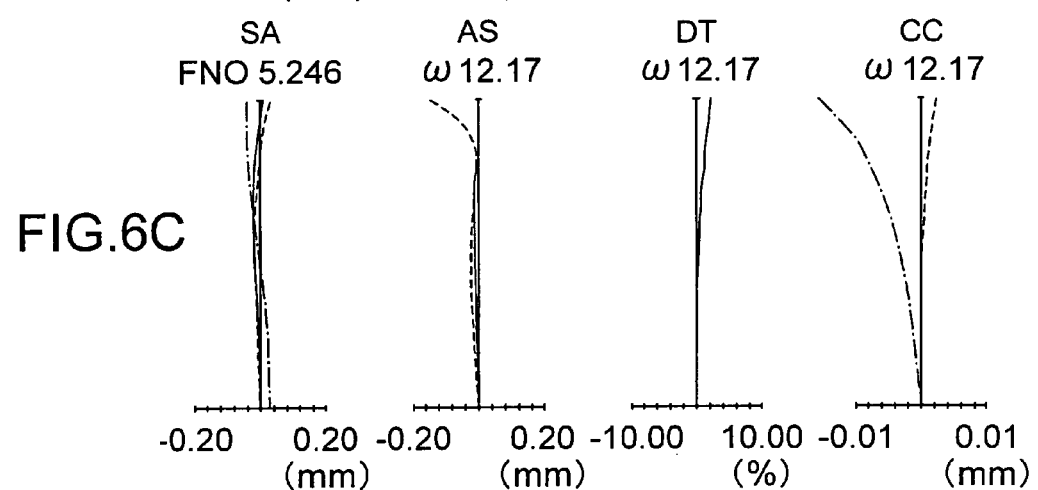
Figure 7A:
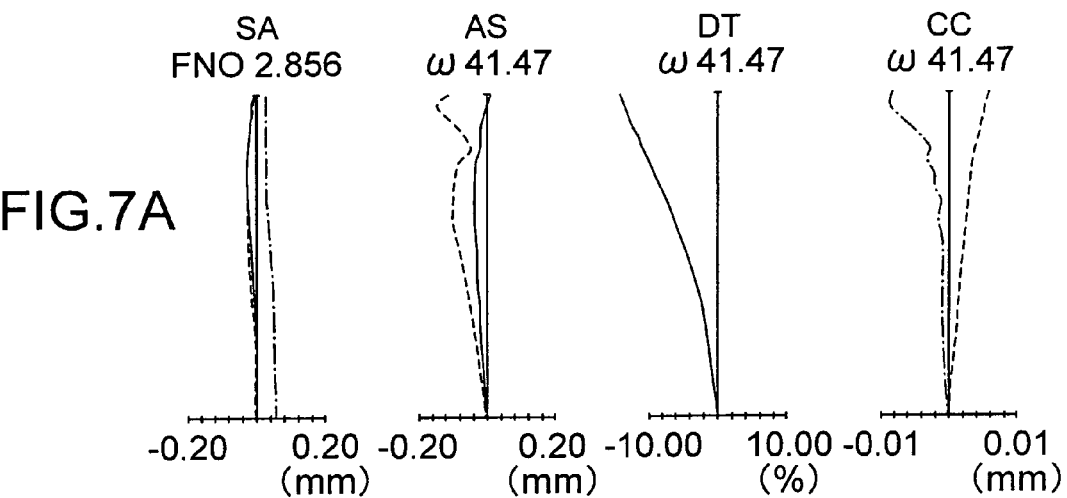
FIG. 7A, FIG. 7B, and FIG. 7C are diagrams showing a spherical aberration (SA), an astigmatism (AS), a distortion (DT), and a chromatic aberration of magnification (CC) at the time of the infinite object point focusing, according to the second embodiment, where.
Figure 7B:
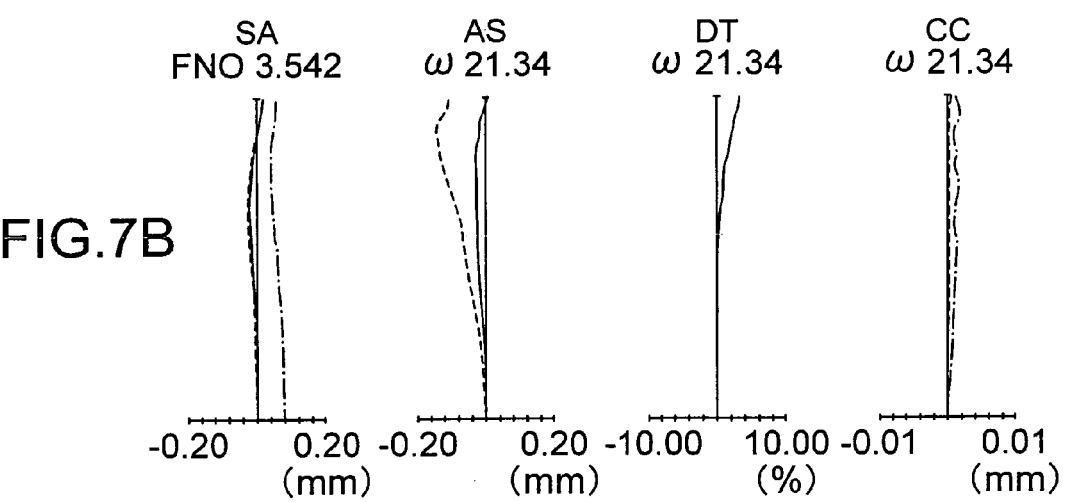
Figure 7C:
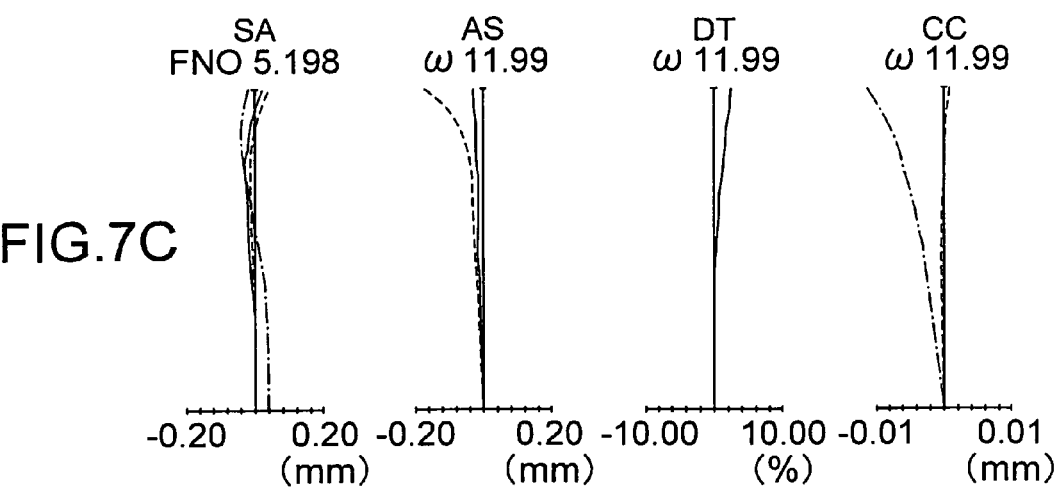
Figure 9A:
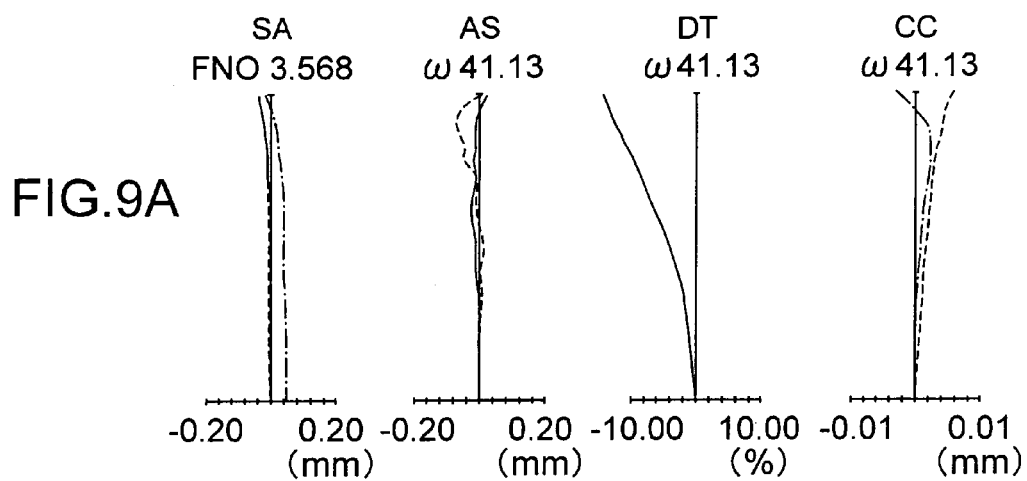
FIG. 9A, FIG. 9B, and FIG. 9C are diagrams showing a spherical aberration (AS), an astigmatism (AS), a distortion (DT), and a chromatic aberration of magnification (CC) at the time of the infinite object point focusing, according to the fourth embodiment, where.
Figure 9B:
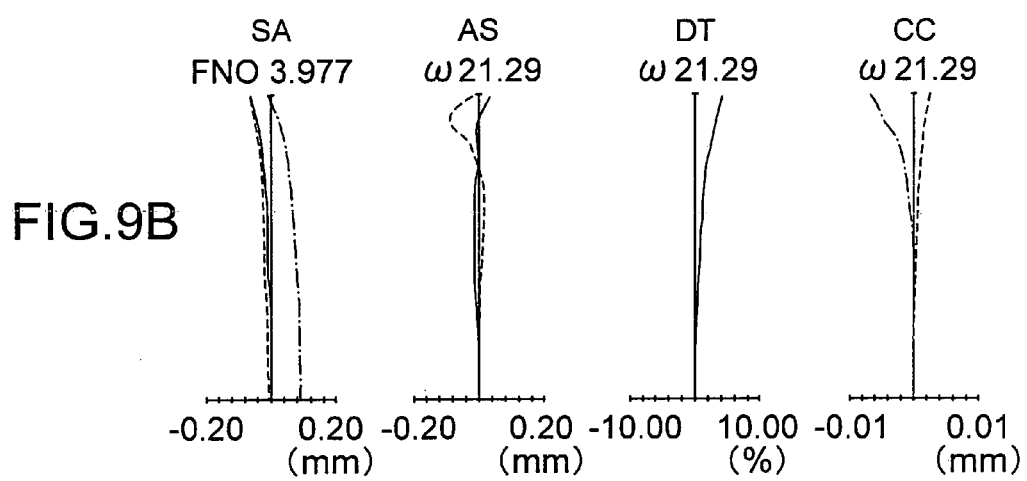
Figure 9C:
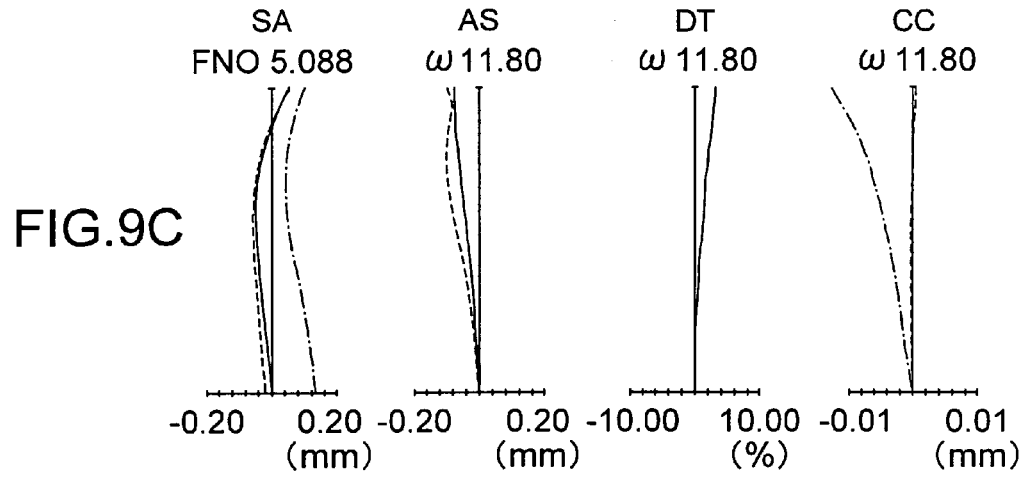
Figure 10A:
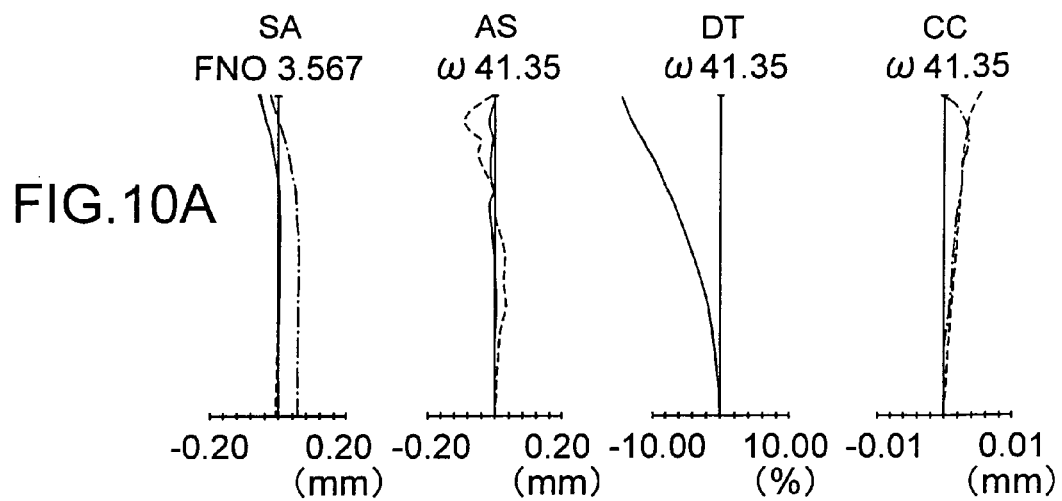
FIG. 10A, FIG. 10B, and FIG. 10C are diagrams showing a spherical aberration (SA), an astigmatism (AS), a distortion (DT), and a chromatic aberration of magnification (CC) at the time of the infinite object point focusing, according to the fifth embodiment, where.
Figure 10B:
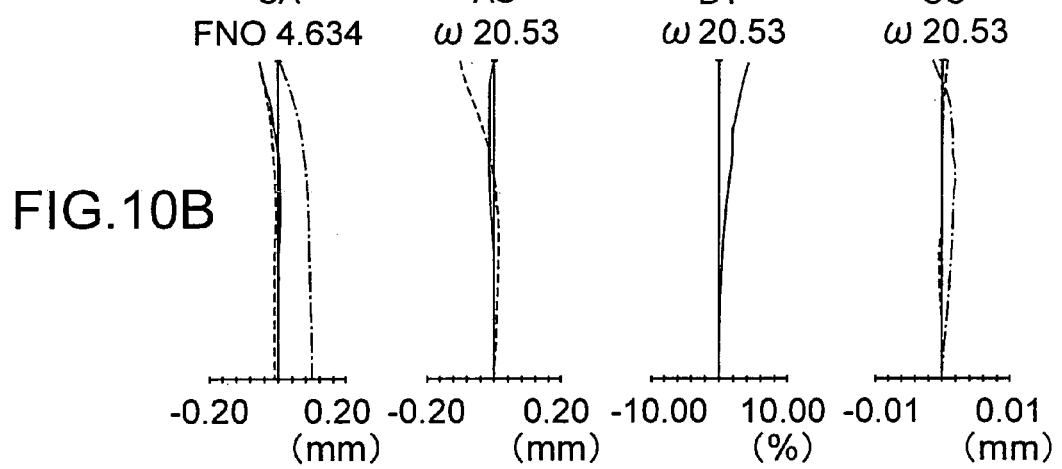
Figure 10C:
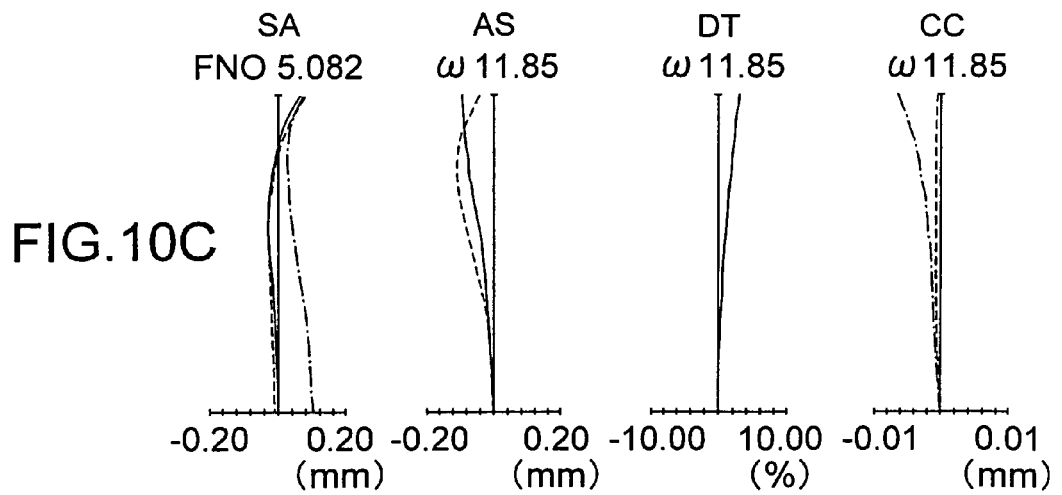

A zoom lens system in the fifth embodiment, as shown in FIG. 5A to FIG. 5c includes, in order from the object side thereof, a first lens unit G1 having a positive refracting power, a second lens unit G2 having a negative refracting power, an aperture stop S, a third lens unit G3 having a positive refracting power, and a fourth lens unit G4 having a positive refracting power.

At the time of zooming from the wide angle end to the telephoto end, the first lens unit G1 is fixed, the second lens unit G2 moves toward the image side, the third lens unit G3 moves toward the object side, and the fourth lens unit G4 moves in a convex locus toward the image side. Moreover, the aperture stop S is fixed, and an amount of light is adjusted by changing an aperture size.

In order from the object side, the first lens unit G1 includes a negative meniscus lens having a convex surfaced directed toward the object side, an optical path bending prism P, and a biconvex positive lens. The second lens unit G2 includes a biconcave negative lens, and a cemented lens of a positive meniscus lens having a convex surface directed toward the image side and a negative meniscus lens having a convex surface directed toward the image. The third lens unit G3 includes a biconvex positive lens, a biconvex positive lens, and a cemented lens of a biconvex positive lens and a biconcave negative lens. The fourth lens unit G4 includes a biconvex positive lens.

An aspheric surface is used for seven surfaces namely, both surfaces of the biconvex positive lens in the first lens unit G1, both surfaces of the biconcave negative lens in the second lens unit G2, both surfaces of the biconvex positive lens nearest to the object side in the third lens unit G3, and a surface on the image side of the biconvex positive lens in the fourth lens unit G4.

Numerical data of each embodiment described above is shown below. Apart from symbols described above, f denotes a focal length of the entire zoom lens system, BF denotes a back focus, each of f1, f2, . . . denotes a focal length of each lens unit, IH denotes an image height, FNO denotes an F number, ω denotes a half image angle, WE denotes a wide angle end, ST denotes an intermediate state, TE denotes a telephoto end, each of r1, r2, . . . denotes a radius of curvature of each lens surface, each of d1, d2, . . . denotes a distance between two lenses, each of nd, . . . denotes a refractive index of each lens for a d-line, and each of vd . . . denotes an Abbe's number for each lens. The overall length of the lens system which will be described later is a length which is obtained by adding the back focus to a distance from the first lens surface up to the last lens surface. BF (back focus) is a unit which is expressed upon air conversion of a distance from the last lens surface up to a paraxial image plane.

When x is let to be an optical axis with a direction of traveling of light as a positive direction, and y is let to be in a direction orthogonal to the optical axis, a shape of the aspheric surface is described by the following expression.

$$x=(y^2/r)/[1+\{1-(K+1)(y/r)^2\}^{1/2}]+A_4y^4+A_6y^6+A_8y^8+A_{10}y^{10}+A_{12}y^{12}$$

where, r denotes a paraxial radius of curvature, K denotes a conical coefficient, $A_4, A_6, A_8, A_{10}$, and $A_{12}$ denote aspherical-surface coefficients of a fourth order, a sixth order, an eight order, a tenth order, and a twelfth order respectively. Moreover, in the aspherical surface coefficients, 'e–n' ('e$^{-n}$') (where, n is an integral number) indicates '$10^{-n}$'.

EXAMPLE 1

| Unit mm | | | | |
|---|---|---|---|---|
| Surface data | | | | |
| Surface no. | r | d | nd | vd |
| 1 | 77.844 | 0.80 | 2.00069 | 25.46 |
| 2 | 9.200 | 2.40 | | |
| 3 | ∞ | 8.20 | 1.90366 | 31.31 |
| 4 | ∞ | 0.16 | | |
| 5 | 193.397 | 1.31 | 1.83400 | 37.16 |
| 6 | −49.493 | 0.15 | | |
| 7* | 34.261 | 2.16 | 1.69350 | 53.21 |
| 8* | −14.647 | Variable | | |
| 9* | −13.352 | 0.70 | 1.83481 | 42.71 |
| 10* | 22.682 | 0.44 | | |
| 11 | 252.820 | 1.86 | 1.92286 | 20.88 |
| 12 | −12.842 | 0.60 | 1.88300 | 40.76 |
| 13 | −167.984 | Variable | | |
| 14(S) | ∞ | Variable | | |
| 15* | 8.002 | 2.96 | 1.49700 | 81.54 |
| 16* | −14.660 | 0.15 | | |
| 17 | 30.743 | 2.97 | 1.49700 | 81.54 |
| 18 | −10.966 | 0.15 | | |
| 19 | 10.806 | 2.98 | 1.49700 | 81.54 |
| 20 | −15.508 | 0.60 | 2.00069 | 25.46 |
| 21 | 4.386 | Variable | | |
| 22 | 38.115 | 1.63 | 1.84666 | 23.78 |
| 23* | −21.313 | Variable | | |
| 24 | ∞ | 0.50 | 1.54771 | 62.84 |
| 25 | ∞ | 0.50 | | |
| 26 | ∞ | 0.50 | 1.51633 | 64.14 |
| 27 | ∞ | 0.37 | | |
| Image plane (Light receiving surface) | ∞ | | | |
| Aspherical surface data | | | | |

7th surface k = 0.000, A4 = −5.26568e−05, A6 = −5.17282e−10,
A8 = −1.75470e−11, A10 = 4.94690e−12

8th surface k = 0.000, A4 = −3.16635e−05, A6 = 8.44649e−09, A8 = 1.05767e−08,
A10 = −1.99626e−10

-continued

Unit mm

9th surface k = 0.000, A4 = −8.17482e−05, A6 = 5.93052e−06, A8 = −2.63197e−08,
A10 = 2.40547e−10

10th surface k = 0.000, A4 = −1.86445e−04, A6 = 8.20271e−07, A8 = 3.64313e−07,
A10 = −7.95160e−09

15th surface k = 0.000, A4 = −7.41375e−04, A6 = 3.05688e−06, A8 = −1.71614e−06,
A10 = 9.84684e−09

16th surface k = 0.000, A4 = 6.43640e−05, A6 = 1.78136e−05, A8 = −3.05757e−06,
A10 = 6.53740e−08

23th surface k = 0.000, A4 = −2.63980e−04, A6 = 1.16721e−05, A8 = −3.52007e−07

Zoom data(∞)

|  | WE | ST | TE |
|---|---|---|---|
| f(mm) | 5.09 | 9.59 | 17.47 |
| Fno. | 2.85 | 3.60 | 5.25 |
| 2ω(°) | 83.04 | 42.30 | 24.35 |
| IH | 3.84 | 3.84 | 3.84 |
| Lens total length | 53.65 | 53.65 | 53.65 |
| BF | 4.34 | 4.33 | 4.08 |
| d8 | 0.60 | 5.57 | 8.25 |
| d13 | 8.14 | 3.17 | 0.60 |
| d14 | 7.45 | 5.09 | 1.00 |
| d21 | 2.88 | 5.26 | 9.03 |
| d23 | 2.44 | 2.42 | 2.63 |

| Zoom ratio | 3.43 |
|---|---|
| f1 | 17.11 |
| f2 | −11.57 |
| f3 | 10.48 |
| f4 | 16.35 |

EXAMPLE 2

Unit mm

Surface data

| Surface no. | r | d | nd | νd |
|---|---|---|---|---|
| 1 | 65.925 | 0.50 | 2.00069 | 25.46 |
| 2 | 9.300 | 2.40 | | |
| 3 | ∞ | 8.20 | 1.90366 | 31.31 |
| 4 | ∞ | 1.00 | 1.90366 | 31.31 |
| 5 | −277.510 | 0.15 | | |
| 6* | 26.733 | 2.40 | 1.77377 | 47.17 |
| 7* | −14.521 | Variable | | |
| 8* | −11.710 | 0.80 | 1.83481 | 42.71 |
| 9* | 36.351 | 0.35 | | |
| 10 | 180.299 | 1.90 | 1.92286 | 20.88 |
| 11 | −14.153 | 0.60 | 1.88300 | 40.76 |
| 12 | −225.703 | Variable | | |
| 13(S) | ∞ | Variable | | |
| 14* | 8.244 | 2.83 | 1.49700 | 81.54 |
| 15* | −13.762 | 0.15 | | |
| 16 | 46.334 | 2.69 | 1.49700 | 81.54 |
| 17 | −13.419 | 0.15 | | |
| 18 | 9.128 | 2.98 | 1.49700 | 81.54 |
| 19 | −27.839 | 0.55 | 2.00069 | 25.46 |
| 20 | 4.439 | Variable | | |
| 21 | 27.202 | 1.70 | 1.80486 | 24.73 |
| 22* | −26.164 | Variable | | |
| 23 | ∞ | 0.50 | 1.54771 | 62.84 |
| 24 | ∞ | 0.50 | | |
| 25 | ∞ | 0.50 | 1.51633 | 64.14 |
| 26 | ∞ | 0.37 | | |
| Image plane (Light receiving surface) | ∞ | | | |

Aspherical surface data

6th surface k = 0.000, A4 = −5.89429e−05, A6 = 9.66816e−07,
A8 = 5.12267e−09, A10 = −3.89395e−14

7th surface k = 0.000, A4 = −2.04092e−05, A6 = 8.76990e−07, A8 = 1.84486e−08,
A10 = −3.23636e−10

8th surface k = 0.000, A4 = 5.75214e−04, A6 = −3.12455e−05, A8 = 1.54493e−06,
A10 = −3.04544e−08

9th surface k = 0.000, A4 = 4.49623e−04, A6 = −3.71061e−05, A8 = 2.28224e−06,
A10 = −5.38299e−08

14th surface k = 0.000, A4 = −8.38654e−04, A6 = −1.48378e−09,
A8 = −1.51482e−06, A10 = −4.12714e−08

15th surface k = 0.000, A4 = −1.67551e−04, A6 = 1.12879e−05, A8 = −2.65748e−06,
A10 = 2.14781e−08

22th surface k = 0.000, A4 = −2.17795e−04, A6 = 8.27428e−06, A8 = −2.32055e−07,
A10 = 2.99343e−11

Zoom data(∞)

|  | WE | ST | TE |
|---|---|---|---|
| f(mm) | 5.09 | 9.48 | 17.66 |
| Fno. | 2.86 | 3.54 | 5.20 |
| 2ω(°) | 82.94 | 42.69 | 23.99 |
| IH | 3.84 | 3.84 | 3.84 |
| Lens total length | 53.24 | 53.24 | 53.24 |
| BF | 3.96 | 3.94 | 4.15 |
| d7 | 0.60 | 6.00 | 9.01 |
| d12 | 8.98 | 3.56 | 0.60 |
| d13 | 7.47 | 5.18 | 1.00 |
| d20 | 2.91 | 5.23 | 9.61 |
| d22 | 2.82 | 2.80 | 2.56 |

| Zoom ratio | 3.47 |
|---|---|
| f1 | 18.57 |
| f2 | −12.25 |
| f3 | 11.18 |
| f4 | 16.81 |

EXAMPLE 3

Unit mm

Surface data

| Surface no. | r | d | nd | νd |
|---|---|---|---|---|
| 1 | 66.411 | 0.70 | 2.00069 | 25.46 |
| 2 | 9.000 | 2.50 | | |
| 3 | ∞ | 8.20 | 1.83400 | 37.16 |
| 4 | ∞ | 0.15 | | |
| 5* | 23.719 | 2.45 | 1.74330 | 49.33 |
| 6* | −13.462 | Variable | | |
| 7* | −12.333 | 0.70 | 1.83481 | 42.71 |
| 8* | 31.790 | 0.35 | | |

-continued

Unit mm

| | | | | |
|---|---|---|---|---|
| 9 | 192.258 | 1.80 | 1.92286 | 20.88 |
| 10 | −13.872 | 0.60 | 1.88300 | 40.76 |
| 11 | −175.193 | Variable | | |
| 12(S) | ∞ | Variable | | |
| 13* | 8.371 | 2.49 | 1.49700 | 81.54 |
| 14* | −13.181 | 0.15 | | |
| 15 | 54.831 | 2.96 | 1.49700 | 81.54 |
| 16 | −12.842 | 0.15 | | |
| 17 | 9.595 | 2.98 | 1.49700 | 81.54 |
| 18 | −32.221 | 0.55 | 2.00069 | 25.46 |
| 19 | 4.464 | Variable | | |
| 20 | 24.030 | 1.80 | 1.68893 | 31.16 |
| 21* | −23.344 | Variable | | |
| 22 | ∞ | 0.50 | 1.54771 | 62.84 |
| 23 | ∞ | 0.50 | | |
| 24 | ∞ | 0.50 | 1.51633 | 64.14 |
| 25 | ∞ | 0.37 | | |
| Image plane (Light receiving surface) | ∞ | | | |

Aspherical surface data

5th surface k = 0.000, A4 = −5.19694e−05, A6 = 6.00438e−07, A8 = 1.53861e−08, A10 = 1.54759e−10

6th surface k = 0.000, A4 = 1.51443e−06, A6 = 4.56560e−07, A8 = 3.30030e−08, A10 = −2.51577e−10

7th surface k = 0.000, A4 = 1.54840e−04, A6 = 9.42798e−06, A8 = −2.57220e−07, A10 = −2.61920e−10

8th surface k = 0.000, A4 = 4.95303e−05, A6 = 2.87644e−06, A8 = 6.73812e−07, A10 = −3.11395e−08

13th surface k = 0.000, A4 = −8.69262e−04, A6 = −3.62744e−06, A8 = −1.10037e−06, A10 = −1.00770e−07

14th surface k = 0.000, A4 = −1.54090e−04, A6 = 7.57294e−06, A8 = −2.53811e−06, A10 = −1.37217e−08

21th surface k = 0.000, A4 = −2.73852e−04, A6 = 1.78364e−05, A8 = −1.06297e−06, A10 = 2.35404e−08

Zoom data(∞)

| | WE | ST | TE |
|---|---|---|---|
| f(mm) | 5.06 | 9.48 | 17.87 |
| Fno. | 3.50 | 4.33 | 5.10 |
| 2ω(°) | 83.15 | 42.68 | 23.72 |
| IH | 3.84 | 3.84 | 3.84 |
| Lens total length | 52.94 | 52.94 | 52.94 |
| BF | 4.23 | 4.17 | 3.90 |
| d6 | 0.60 | 6.15 | 9.20 |
| d11 | 9.17 | 3.59 | 0.60 |
| d12 | 7.60 | 5.30 | 1.00 |
| d19 | 2.83 | 5.21 | 9.73 |
| d21 | 2.70 | 2.65 | 2.37 |

| | |
|---|---|
| Zoom ratio | 3.53 |
| f1 | 18.94 |
| f2 | −12.44 |
| f3 | 11.15 |
| f4 | 17.46 |

EXAMPLE 4

Unit mm

Surface data

| Surface no. | r | d | nd | νd |
|---|---|---|---|---|
| 1 | −14705.084 | 0.70 | 2.00069 | 25.46 |
| 2 | 10.212 | 2.21 | | |
| 3 | ∞ | 8.00 | 1.84666 | 23.78 |
| 4 | ∞ | 0.20 | | |
| 5* | 27.929 | 2.69 | 1.76802 | 49.24 |
| 6* | −12.555 | Variable | | |
| 7* | −14.917 | 0.70 | 1.80610 | 40.92 |
| 8* | 218.645 | 0.40 | | |
| 9 | −35.642 | 1.91 | 1.92286 | 20.88 |
| 10 | −9.232 | 0.60 | 1.88300 | 40.76 |
| 11 | 433.819 | Variable | | |
| 12(S) | ∞ | Variable | | |
| 13* | 7.465 | 2.28 | 1.49700 | 81.54 |
| 14* | −28.835 | 0.20 | | |
| 15 | 23.174 | 3.27 | 1.49700 | 81.54 |
| 16 | −13.702 | 0.25 | | |
| 17 | 7.052 | 2.30 | 1.48749 | 70.23 |
| 18 | −44.558 | 0.55 | 2.00330 | 28.27 |
| 19 | 4.230 | Variable | | |
| 20 | 14.974 | 2.12 | 1.52542 | 55.78 |
| 21* | −22.702 | Variable | | |
| 22 | ∞ | 0.50 | 1.51633 | 64.14 |
| 23 | ∞ | 0.50 | | |
| 24 | ∞ | 0.50 | 1.51633 | 64.14 |
| 25 | ∞ | 0.37 | | |
| Image plane (Light receiving surface) | ∞ | | | |

Aspherical surface data

5th surface k = 0.000, A4 = 3.30509e−06, A6 = −5.05697e−06, A8 = 3.19905e−07, A10 = −7.90084e−09

6th surface k = 0.000, A4 = 6.46770e−05, A6 = −3.26766e−06, A8 = 2.27854e−07, A10 = −5.97274e−09

7th surface k = 0.000, A4 = −2.04372e−04, A6 = 2.19114e−05, A8 = −6.67656e−08, A10 = −1.55429e−08

8th surface k = 0.000, A4 = −3.14250e−04, A6 = 2.31616e−05, A8 = 4.37604e−07, A10 = −3.72953e−08

13th surface k = 0.000, A4 = −2.87575e−04, A6 = −1.45256e−05, A8 = 1.95189e−06, A10 = −6.50435e−08

14th surface k = 0.000, A4 = 3.80915e−04, A6 = −1.07738e−05, A8 = 1.66012e−06, A10 = −4.60116e−08

21th surface k = 0.000, A4 = 3.98780e−05, A6 = −2.76560e−05, A8 = 1.66259e−06, A10 = −3.70991e−08

Zoom data(∞)

| | WE | ST | TE |
|---|---|---|---|
| f(mm) | 5.08 | 9.37 | 17.70 |
| Fno. | 3.57 | 3.98 | 5.09 |
| 2ω(°) | 82.27 | 42.58 | 23.60 |
| IH | 3.84 | 3.84 | 3.84 |
| Lens total length | 52.95 | 52.95 | 52.95 |
| BF | 4.38 | 4.36 | 4.60 |
| d6 | 0.60 | 5.62 | 9.06 |
| d11 | 9.05 | 4.05 | 0.60 |

-continued

Unit mm

| | | | |
|---|---|---|---|
| d12 | 7.75 | 5.16 | 1.00 |
| d19 | 2.76 | 5.36 | 9.28 |
| d21 | 2.85 | 2.83 | 3.07 |

| Zoom ratio | 3.48 |
|---|---|
| f1 | 18.48 |
| f2 | −12.15 |
| f3 | 11.44 |
| f4 | 17.51 |

EXAMPLE 5

Unit mm

Surface data

| Surface no. | r | d | nd | vd |
|---|---|---|---|---|
| 1 | 4090.718 | 0.60 | 2.00069 | 25.46 |
| 2 | 10.220 | 2.18 | | |
| 3 | ∞ | 8.00 | 1.84666 | 23.78 |
| 4 | ∞ | 0.20 | | |
| 5* | 28.231 | 2.68 | 1.77377 | 47.17 |
| 6* | −12.688 | Variable | | |
| 7* | −17.660 | 0.70 | 1.74320 | 49.34 |
| 8* | 75.241 | 0.66 | | |
| 9 | −20.564 | 1.74 | 1.92286 | 20.88 |
| 10 | −8.639 | 0.60 | 1.88300 | 40.76 |
| 11 | −79.785 | Variable | | |
| 12(S) | ∞ | Variable | | |
| 13* | 7.679 | 2.33 | 1.49700 | 81.54 |
| 14* | −15.798 | 0.20 | | |
| 15 | 26.079 | 3.17 | 1.49700 | 81.54 |
| 16 | −13.348 | 0.20 | | |
| 17 | 9.368 | 2.01 | 1.48749 | 70.23 |
| 18 | −53.174 | 0.58 | 2.00330 | 28.27 |
| 19 | 4.540 | Variable | | |
| 20 | 16.212 | 2.00 | 1.52542 | 55.78 |
| 21* | −24.034 | Variable | | |
| 22 | ∞ | 0.50 | 1.51633 | 64.14 |
| 23 | ∞ | 0.50 | | |
| 24 | ∞ | 0.50 | 1.51633 | 64.14 |
| 25 | ∞ | 0.37 | | |
| Image plane (Light receiving surface) | ∞ | | | |

Aspherical surface data

5th surface k = 0.000, A4 = 1.01830e−05, A6 = −4.04209e−06, A8 = 2.57001e−07, A10 = −6.20762e−09

6th surface k = 0.000, A4 = 6.94081e−05, A6 = −2.41520e−06, A8 = 1.79959e−07, A10 = −4.73227e−09

7th surface k = 0.000, A4 = −2.09918e−04, A6 = 2.14206e−05, A8 = 1.48613e−07, A10 = −2.78467e−08

8th surface k = 0.000, A4 = −3.21276e−04, A6 = 2.35826e−05, A8 = 1.05063e−06, A10 = −7.39184e−08

13th surface k = 0.000, A4 = −5.18096e−04, A6 = −2.66694e−05, A8 = 2.90343e−06, A10 = −1.36413e−07

14th surface k = 0.000, A4 = 3.10456e−04, A6 = −3.23413e−05, A8 = 3.27647e−06, A10 = −1.40801e−07

-continued

Unit mm

21th surface k = 0.000, A4 = 9.23474e−05, A6 = −2.94633e−05, A8 = 1.62604e−06, A10 = −3.13129e−08

Zoom data(∞)

| | WE | ST | TE |
|---|---|---|---|
| f(mm) | 5.10 | 9.86 | 17.78 |
| Fno. | 3.57 | 4.63 | 5.08 |
| 2ω(°) | 82.70 | 41.06 | 23.70 |
| IH | 3.84 | 3.84 | 3.84 |
| Lens total length | 52.95 | 52.95 | 52.95 |
| BF | 4.74 | 4.44 | 4.44 |
| d6 | 0.60 | 5.91 | 8.77 |
| d11 | 8.78 | 3.48 | 0.60 |
| d12 | 8.14 | 5.22 | 1.00 |
| d19 | 2.84 | 6.07 | 10.30 |
| d21 | 3.21 | 2.91 | 2.91 |

| Zoom ratio | 3.49 |
|---|---|
| f1 | 18.70 |
| f2 | −12.33 |
| f3 | 11.76 |
| f4 | 18.75 |

Aberration diagrams at the time of infinite object point focusing in the first embodiment to the fifth embodiment are shown in FIG. 6A to FIG. 10C respectively. In these aberration diagrams, FIG. 6A, FIG. 7A, FIG. 8A, FIG. 9A, and FIG. 10A show a spherical aberration, an astigmatism, a distortion, and a chromatic aberration of magnification at the wide angle end, FIG. 6B, FIG. 7B, FIG. 8B, FIG. 9B, and FIG. 10B show the spherical aberration, the astigmatism, the distortion, and the chromatic aberration of magnification at the intermediate focal length state, and FIG. 6C, FIG. 7C, FIG. 8C, FIG. 9C, and FIG. 10C shows the spherical aberration, the astigmatism, the distortion, and the chromatic aberration of magnification at the telephoto end. In each diagrams, "ω" shows a half-image angle.

Next, zoom lens systems in image pickup apparatuses of the embodiments from the sixth embodiment to the tenth embodiment will be described below. In embodiments from the sixth embodiment to the tenth embodiment, recording and display of an image is carried out upon correcting electrically the pin-cushion distortion at the telephoto side and a barrel distortion occurring at the wide angle side. The zoom lens system in the sixth embodiment has the same structure as the zoom lens system in the first embodiment. The zoom lens system in the seventh embodiment has the same structure as the zoom lens system in the second embodiment. The zoom lens system in the eighth embodiment has the same structure as the zoom lens system in the third embodiment. The zoom lens system in the ninth embodiment has the same structure as the zoom lens system in the fourth embodiment. The zoom lens system in the tenth embodiment has the same structure as the zoom lens system in the fifth embodiment. Therefore, repeated description of the zoom lens system is omitted.

Data of the image height and full-image angle in the sixth embodiment is shown below.

|       | WE    | ST    | TE    |
|-------|-------|-------|-------|
| f(mm) | 5.09  | 9.59  | 17.47 |
| Fno.  | 2.85  | 3.60  | 5.25  |
| 2ω(°) | 74.09 | 42.30 | 24.35 |
| IH    | 3.37  | 3.84  | 3.84  |

Data of the image height and full-image angle in the seventh embodiment is shown below.

|       | WE    | ST    | TE    |
|-------|-------|-------|-------|
| f(mm) | 5.09  | 9.48  | 17.66 |
| Fno.  | 2.86  | 3.54  | 5.20  |
| 2ω(°) | 74.09 | 42.69 | 23.99 |
| IH    | 3.37  | 3.84  | 3.84  |

Data of the image height and full-image angle in the eighth embodiment is shown below.

|       | WE    | ST    | TE    |
|-------|-------|-------|-------|
| f(mm) | 5.06  | 9.48  | 17.87 |
| Fno.  | 3.50  | 4.33  | 5.10  |
| 2ω(°) | 74.40 | 42.68 | 23.72 |
| IH    | 3.38  | 3.84  | 3.84  |

Data of the image height and full-image angle in the ninth embodiment is shown below.

|       | WE    | ST    | TE    |
|-------|-------|-------|-------|
| f(mm) | 5.08  | 9.37  | 17.70 |
| Fno.  | 3.57  | 3.98  | 5.09  |
| 2ω(°) | 73.59 | 42.58 | 23.60 |
| IH    | 3.38  | 3.84  | 3.84  |

Data of the image height and full-image angle in the tenth embodiment is shown below.

|       | WE    | ST    | TE    |
|-------|-------|-------|-------|
| f(mm) | 5.10  | 9.86  | 17.78 |
| Fno.  | 3.57  | 4.63  | 5.08  |
| 2ω(°) | 73.95 | 41.06 | 23.70 |
| IH    | 3.38  | 3.84  | 3.84  |

Data of the conditional expressions (1) to (6) according to the each of embodiments are shown below.

|   | Example 1 | Example 2 | Example 3 | Example 4 | Example 5 |
|---|-----------|-----------|-----------|-----------|-----------|
| (A) $(R_{2n1f}+R_{2n1r})/(R_{2n1f}-R_{2n1r})$ | −0.26 | −0.51 | −0.44 | −0.87 | −0.62 |
| (1) $\tan^{-1}(IH_w/f_w)$ | 37.044 | 37.048 | 37.200 | 37.081 | 36.973 |
| (2) $f_{1g}/f_w$ | 3.364 | 3.650 | 3.745 | 3.638 | 3.665 |
| (3) $|f_{L1}/f_w|$ | 2.061 | 2.136 | 2.069 | 2.007 | 2.007 |
| (4) $N_{L1}$ | 2.00069 | 2.00069 | 2.00069 | 2.00069 | 2.00069 |
| (5) $(R_{L1f}+R_{L1r})/(R_{L1f}-R_{L1r})$ | 1.268 | 1.328 | 1.314 | 0.999 | 1.005 |
| (6) $mg_{2z}/mg_{3z}$ | 1.143 | 1.082 | 1.114 | 1.110 | 1.132 |

|   | Example 6 | Example 7 | Example 8 | Example 9 | Example 10 |
|---|-----------|-----------|-----------|-----------|------------|
| (A) $(R_{2n1f}+R_{2n1r})/(R_{2n1f}-R_{2n1r})$ | −0.26 | −0.51 | −0.44 | −0.87 | −0.62 |
| (1) $\tan^{-1}(IH_w/f_w)$ | 33.532 | 33.535 | 33.711 | 33.627 | 33.524 |
| (2) $f_{1g}/f_w$ | 3.364 | 3.650 | 3.745 | 3.638 | 3.665 |
| (3) $|f_{L1}/f_w|$ | 2.061 | 2.136 | 2.069 | 2.007 | 2.007 |
| (4) $N_{L1}$ | 2.00069 | 2.00069 | 2.00069 | 2.00069 | 2.00069 |
| (5) $(R_{L1f}+R_{L1r})/(R_{L1f}-R_{L1r})$ | 1.268 | 1.328 | 1.314 | 0.999 | 1.005 |
| (6) $mg_{2z}/mg_{3z}$ | 1.143 | 1.082 | 1.114 | 1.110 | 1.132 |

Incidentally, for preventing the occurrence of the ghost and the flare, generally, the antireflection coating is applied to a surface of a lens in contact with air.

On the other hand, at a cemented surface of a cemented lens, a refractive index of an adhesive is sufficiently higher than a refractive index of air. Therefore, in many cases, a reflectance is originally of the level of a single-layer coating, or lower, and the coating is applied in few cases. However, when the antireflection coating is applied positively even to the cemented surface, it is possible to reduce further the ghost and the flare, and to achieve a more favorable image.

Particularly, recently, a glass material having a high refractive index has been widely used in an optical system of cameras, for having a high effect on the aberration correction. However, when the glass material having a high refractive index is used as a cemented lens, a reflection at the cemented surface becomes unignorable. In such a case, applying the antireflection coating on the cemented surface is particularly effective.

An effective usage of the cemented surface coating has been disclosed in Japanese Patent Application Laid-open Publication No. Hei 2-27301, No. 2001-324676, No. 2005-92115, and U.S. Pat. No. 7,116,482. In these patent literatures, a cemented lens surface coating in a first lens unit of a positive preceding zoom lens system has been described, and the same as disclosed in these patent literatures may be implemented for the cemented lens surface in the first lens unit having a positive power, of the present invention.

As a coating material to be used, according to a refractive index of the adhesive material and a refractive index of the lens which is a base, coating materials such as $Ta_2O_5$, $TiO_2$, $Nb_2O_5$, $ZrO_2$, $HfO_2$, $CeO_2$, $SnO_2$, $In_2O_3$, $ZnO$, and $Y_2O_3$ having a comparatively higher refractive index, and coating materials such as $MgF_2$, $SiO_2$, and $Al_2O_3$ having a comparatively lower refractive index may be selected appropriately, and set to a film thickness which satisfies phase conditions.

Naturally, similar to the coating on the surface of the lens in contact with air, the coating on the cemented surface may also be let to be a multi layer coating. By combining appropriately a film thickness and a coating material of number of films not less than in two layers, it is possible to reduce further the reflectance, and to control spectral characteristics and angular characteristics.

Moreover, it is needless to mention that for the cemented surface of lenses other than the lenses in the first lens unit, it is effective to apply the coating on the cemented surface based on a similar idea.

(Correction of Distortion)

Incidentally, when the zoom lens system of the present invention is used, a digital correction of distortion of an image is carried out electrically. A basic concept for the digital correction of the distortion of an image will be described below.

Figure 12:
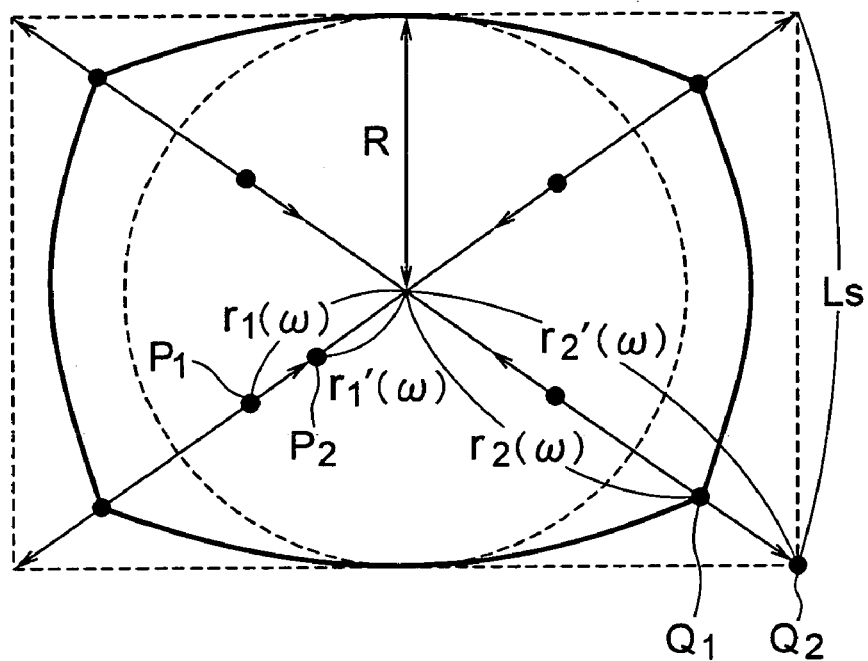
FIG. 12 is a diagram describing a correction of distortion.

For example, as shown in FIG. 12, with a point of intersection of an optical axis and an image pickup plane to be a center, a magnification on a circumference (image height) of a circle of radius R making a contact internally with a longer side of an effective image pickup plane is fixed, and this circumference is let to be a base reference for the correction. Next, each point on a circumference (image height) of an arbitrary radius $r(\omega)$ other than the radius R is moved in a substantial direction of radiation, and the correction is carried out by moving on a concentric circle such that the radius becomes $r'(\omega)$.

For example, in FIG. 12, a point $P_1$ on a circumference of an arbitrary radius $r_1(\omega)$ positioned at an inner side of a circle of radius R is moved to a point $P_2$ on a circumference of a radius $r_1'(\omega)$ which is to be corrected, directed toward a center of the circle. Moreover, a point $Q_1$ on a circumference of an arbitrary radius $r_2(\omega)$ positioned at an outer side of the circle of radius R is moved to a point $Q_2$ on a circumference of a radius $r_2'(\omega)$ which is to be corrected, directed toward a direction away from the center of the circle.

Here, $r'(\omega)$ can be expressed as follows.

$$r'(\omega)=\alpha \cdot f \cdot \tan \omega (0 \leq \alpha \leq 1)$$

where, $\omega$ is a half image angle of an object and f is a focal length of an imaging optical system (the zoom lens system in the present invention).

Here, when an ideal image height corresponding to a circle (image height) of radius R is let to be Y, then $$\alpha=R/Y=R/(f \cdot \tan \omega).$$

The optical system, ideally, is rotationally symmetric with respect to an optical axis. In other words, the distortion also occurs in a rotationally symmetric manner with respect to the optical axis. Consequently, as it has been described above, in a case of correcting electrically the optical distortion, when it is possible to carry out correction by fixing a magnification on a circumference (image height) of the circle of radius R making a contact internally with a shorter side of the effective image pickup plane, with a point of intersection of an optical axis on a reproduced image, and an image pickup plane to be a center, and moving each point on the circumference (image height) of radius $r(\omega)$ other than the radius R in a substantial direction of radiation, and moving on a concentric circle such that the radius becomes $r'(\omega)$, it can be considered to be advantageous from a point of amount of data and amount of calculation.

Incidentally, an optical image ceases to be a continuous amount at a point of time when an image is picked up by an electronic image pickup element (due to sampling). Consequently, the circle of radius R which is drawn exactly on the optical image ceases to be an accurate circle as long as pixels on the electronic image pickup element are not arranged radially.

In other words, regarding a shape correction of image data expressed for each discrete coordinate point, a circle which can fix the magnification does not exist. Therefore, for each pixel $(X_i, Y_j)$, a method of determining coordinates of a destination of movement $(X_i', Y_j')$ may be used. When two or more points $(X_i, Y_j)$ have moved to the coordinates $(X_i', Y_j')$, an average of values of each pixel is taken. Moreover, when there is no point which has moved, interpolation may be performed by using a value of coordinate $(X_i', Y_j')$ of some of the surrounding pixels.

Such method is effective for correction when the distortion with respect to the optical axis is remarkable due to a manufacturing error etc. of the optical system or the electronic image pickup element, in the electronic image pickup apparatus having the zoom lens system in particular, and when the circle of the radius R drawn on the optical image is asymmetric. Moreover, it is effective for correction when there occurs to be a geometric distortion at the time of reproducing a signal to an image in an image pickup element or various output devices.

In the electronic image pickup apparatus of the present invention, for calculating a correction amount $r'(\omega)-r(\omega)$, an arrangement may be made such that a relationship between $r(\omega)$, in other words, half image angle and the image height, or a relationship between a real image height r and an ideal image height $r'/\alpha$ is recorded in a recording medium which is built-in in the electronic image pickup apparatus.

For an image after the distortion correction, not to have an extreme shortage of an amount of light at both ends in a direction of short side, the radius R may satisfy the following conditional expression.

$$0 \leq R \leq 0.6 L_s$$

where, $L_s$ is a length of a short side of the effective image pickup surface.

It is preferable that the radius R satisfies the following conditional expression.

$$0.3 L_s \leq R \leq 0.6 L_s$$

Furthermore, it is most advantageous to match the radius R with a radius of a circle making an internal contact in a short side direction of a substantially effective image pickup plane.

In a case of correction in which, the magnification is fixed near the radius R=0, in other words, near on the axis, it is somewhat disadvantageous from an aspect of substantial number of images, but it is possible to secure an effect for making the size small even when the angle is widened.

A focal length interval which requires a correction is divided into a number of focal point zones. Moreover, the correction may be carried out with the amount of correction as in a case in which, a correction result which satisfies substantially the following relationship $$r'(\omega)=\alpha \cdot f \cdot \tan \omega$$

near a telephoto end in the focal point zones which are divided.

However, in this case, at a wide angle end in the focal point zones which are divided, a barrel-shape distortion at the wide angle end of the focal point zones which are divided is remained to some extent. Moreover, when the number of divided zones is increased, there arises a need to hold specific data necessary for correction, additionally in a recording medium. Therefore it is not preferable to increase the number of divided zones. Therefore, one or a plurality of coefficients associated with each focal length in the focal point zones which are divided, are calculated in advance. The coefficients may be determined based on a measurement by simulation or by actual equipment.

An amount of correction in a case in which, the correction result which satisfies substantially the following relationship $$r'(\omega)=\alpha \cdot f \tan \omega$$

near the telephoto end in the focal point zones which are divided may be calculated, and may let to be a final amount of correction by multiplying uniformly the coefficient for each focal length with respect to this amount of correction.

Incidentally, when there is no distortion in an image achieved by imaging (forming an image) of an infinite object, the following relationship $$f=y/\tan \omega$$

holds.

Here, y denotes a height (image height) of an image point from the optical axis, f denotes a focal length of an imaging system (zoom lens system in the present invention), and $\omega$ denotes an angle (object half image angle) with respect to the optical axis in an object point direction corresponding to image points connecting from a center on an image pickup plane up to a position of y.

When there is a barrel-shape distortion in the imaging system, the relationship becomes $$f>y/\tan \omega.$$

In other words, when the focal length f of the imaging system, and the image height y are let to be fixed, a value of $\omega$ becomes large.

(Digital Camera)

Further, the present invention could be applied to an electrical image pick up apparatus, especially a digital camera, video camera etc. in which the object image is formed by the above-mentioned zoom lens, then the object image is light-received such as CCD etc. Such embodiment will be described below.

Figure 13:
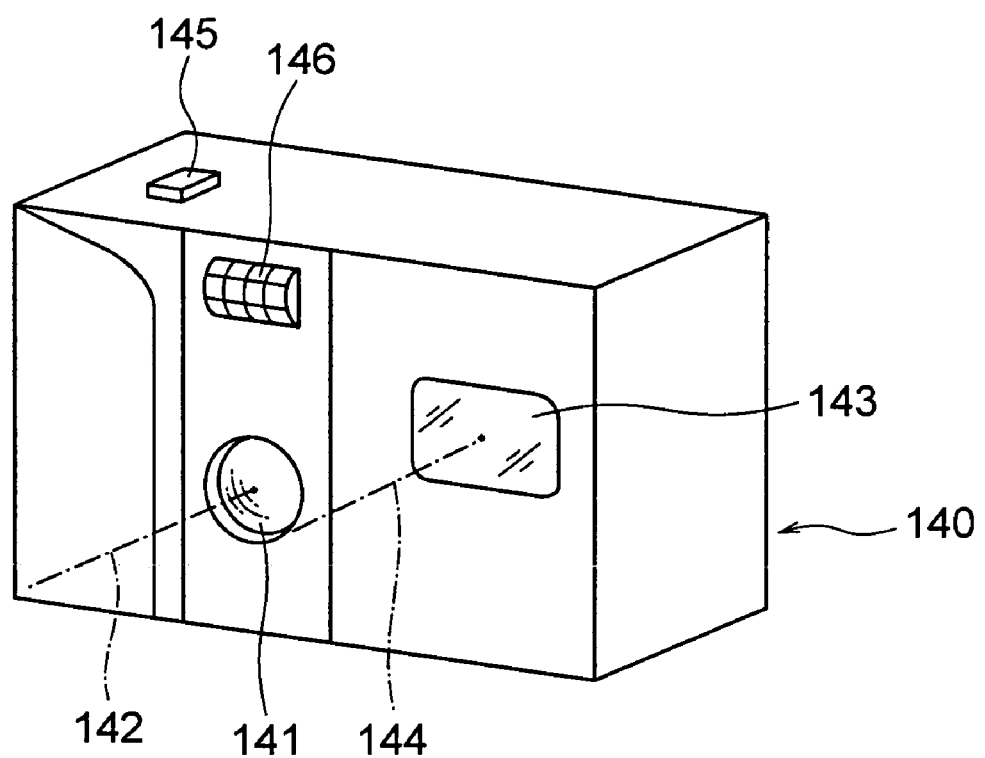
FIG. 13 is a front perspective view showing an appearance of a digital camera in which, an optical path reflecting zoom lens system is incorporated.
Figure 14:
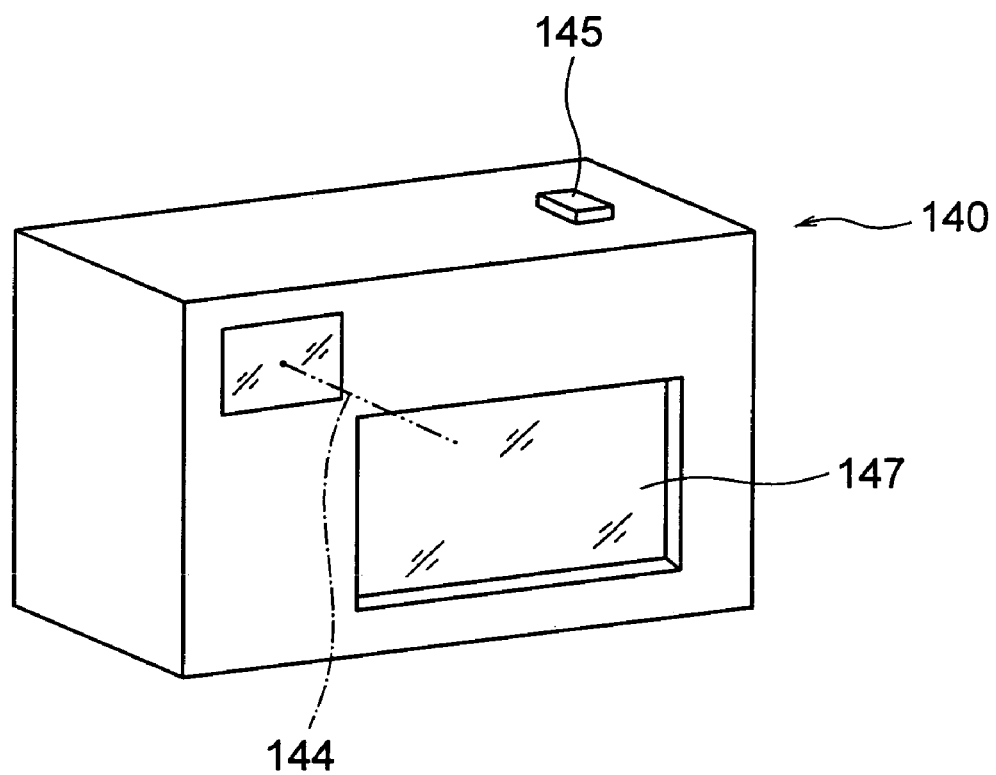
FIG. 14 is a rear perspective view of the digital camera in FIG. 13.
Figure 15:
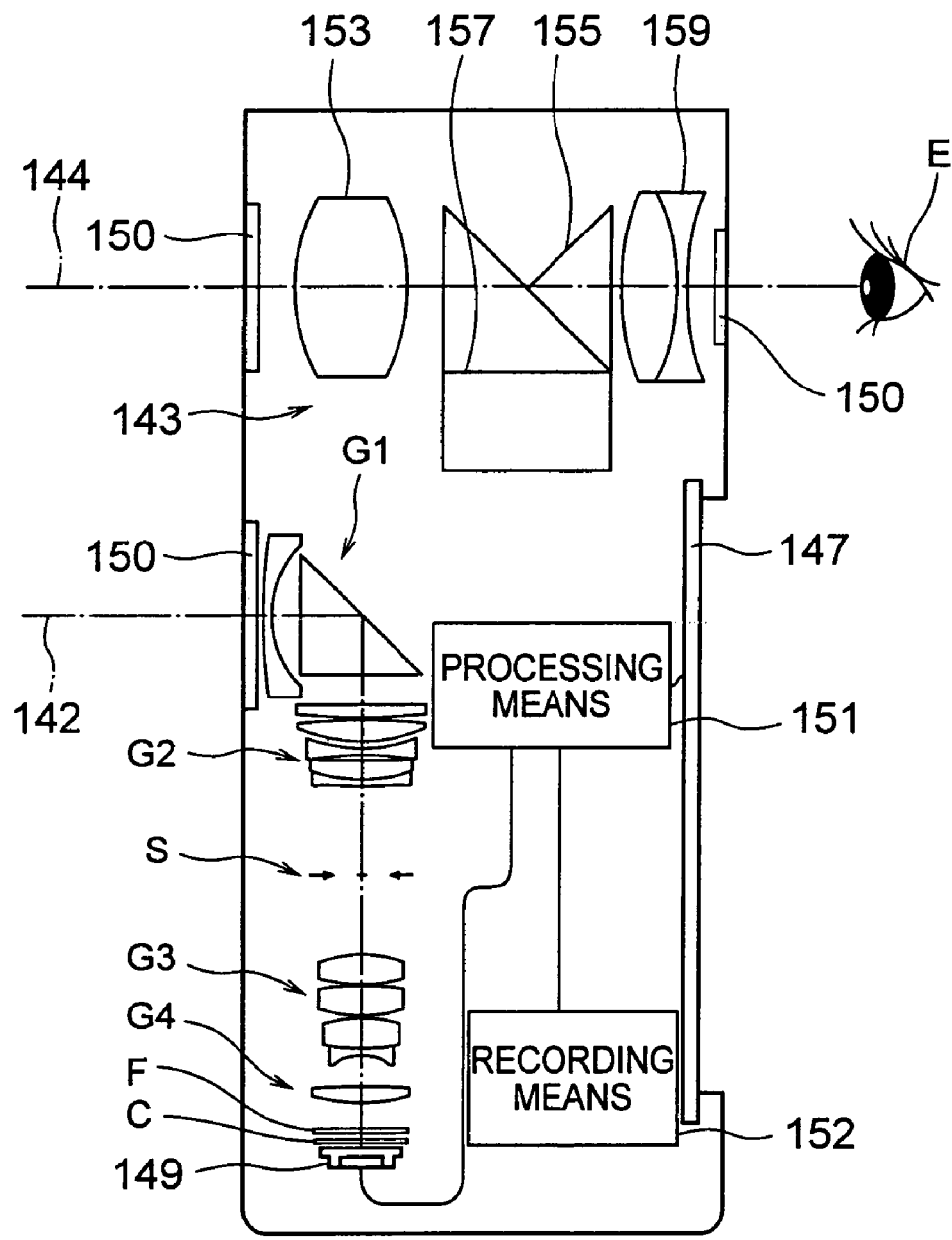
FIG. 15 is a cross-sectional view of the digital camera in FIG. 13.

FIG. 13 to FIG. 15 are conceptual diagrams of a structure of a digital camera according to the present invention in which a zoom lens system described above is incorporated in a taking optical system 141. FIG. 13 is a front perspective view showing an appearance of a digital camera 140, FIG. 14 is a rear perspective view of the same, and FIG. 15 is a schematic cross-sectional view showing a structure of the digital camera 140. The digital camera 140, in a case of this example, includes the taking optical system 141 having a taking optical path 142, a finder optical system 143 having a finder optical path 144, a shutter button 145, a flash 146, a liquid-crystal display monitor 147, a focal-length changing button 161, and a setting changing switch 162 etc., when the shutter button 145 disposed on an upper portion of the digital camera 140 is pressed, in synchronization with the pressing of the shutter button 145, a photograph is taken by the taking optical system 141 such as the optical path reflecting zoom lens system in the first embodiment. An object image formed by the taking optical system 141 is formed on an image pickup surface of a CCD 149 via a cover glass C and a low pass filter on which a wavelength region restricting coating is applied. An object image which is received as light by the CCD 149 is displayed on the liquid-crystal display monitor 147 which is provided on a rear surface of the digital camera 140 as an electronic image, via a processing means 151. Moreover, a recording means 152 is connected to the processing means 151, and it is also possible to record the electronic image which is taken. The recording means 152 may be provided separately from the processing means 151, or may be formed by recording by writing electronically in a flexible disc, a memory card, or an MO etc. Moreover, the camera may be formed as a silver-salt camera in which a silver-salt film is disposed instead of the CCD 149.

Furthermore, a finder objective optical system 153 is disposed on the finder optical path 144. An object image formed by the finder objective optical system 153 is formed on a field frame 157 of a Porro prism 155 which is an image erecting member. On a rear side of the Porro prism 155, an eyepiece optical system 159 which guides an erected image to a viewer's eyeball, is disposed. A cover member 150 is disposed on an emergence side of the eyepiece optical system 159.

Since the digital camera 140 structured in such manner has the taking optical system 141 according to the present invention, has a high zoom ratio of 3.5 magnifications. Since the zoom lens has a high optical performance, it is possible to realize the inexpensive digital camera in which the depth is extremely thin.

Further, the example shown in FIG. 15, a plane parallel plate is disposed as the cover member 150. However, a lens having a power could be used. Furthermore, the cover member 150 could be omitted.

(Internal Circuit Structure)

Figure 16:
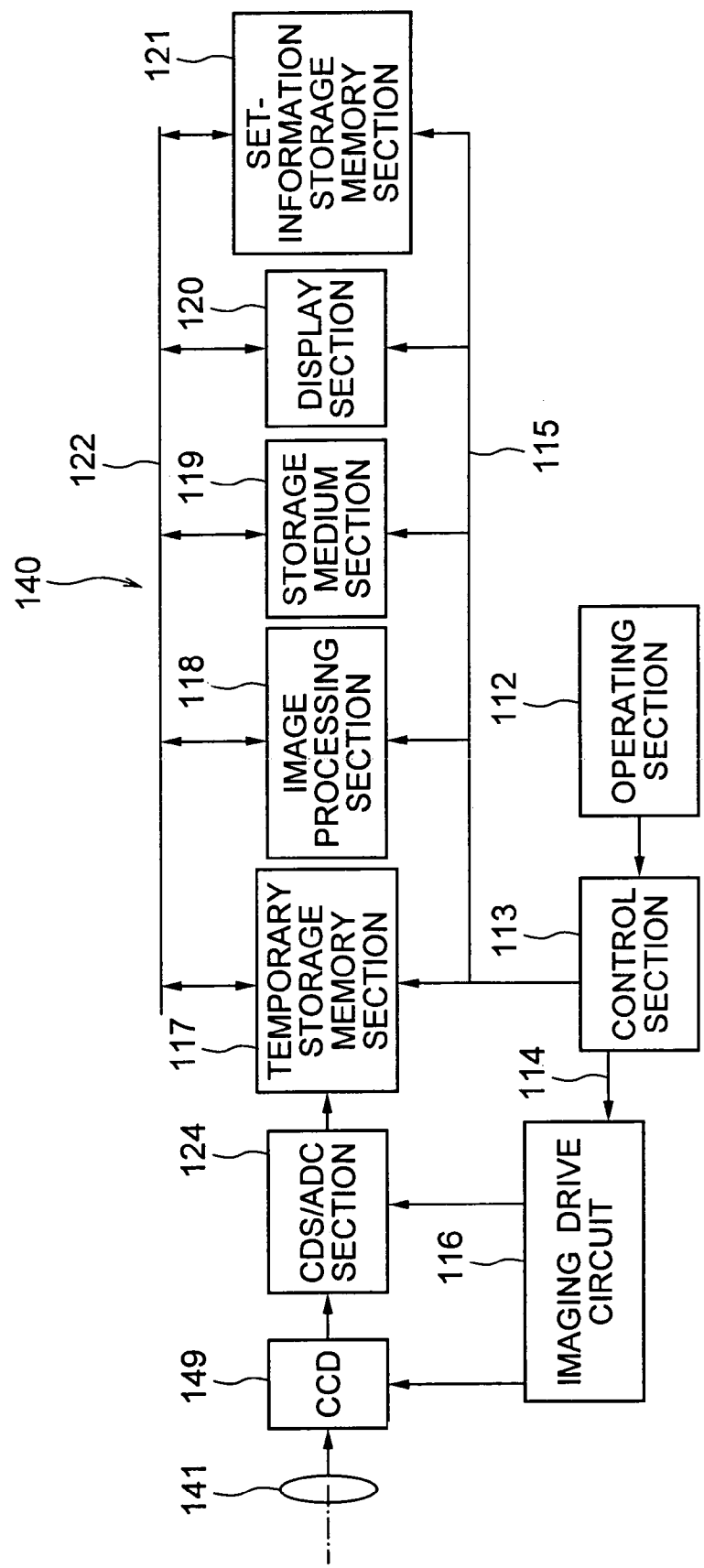
FIG. 16 is a structural block diagram of an internal circuit of main components of a digital camera.

FIG. 16 is a structural block diagram of an internal circuit of main components of the digital camera 140. In the following description, the processing means 151 described above includes for instance, a CDS/ADC section 124, a temporary storage memory 117, and an image processing section 118, and a storage means 152 consists of a storage medium section 119 for example.

As shown in FIG. 16, the digital camera 140 includes an operating section 112, a control section 113 which is connected to the operating section 112, the temporary storage memory 117 and an imaging drive circuit 116 which are connected to a control-signal output port of the control section 113, via a bus 114 and a bus 115, the image processing section 118, the storage medium section 119, a display section 120, and a set-information storage memory section 121.

The temporary storage memory 117, the image processing section 118, the storage medium section 119, the display section 120, and the set-information storage memory section 121 are structured to be capable of mutually inputting and outputting data via a bus 122. Moreover, the CCD 149 and the CDS/ADC section 124 are connected to the imaging drive circuit 116.

The operating section 112 includes various input buttons and switches, and is a circuit which informs the control section, event information which is input from outside (by a user of the digital camera) via these input buttons and switches.

The control section 113 is a central processing unit (CPU), and has a built-in computer program memory which is not shown in the diagram. The control section 113 is a circuit which controls the entire digital camera 140 upon receiving instructions and commands input by the user of the camera via the operating section 112, according to a computer program stored in this computer program memory.

The CCD 149 receives as light an object image which is formed via the taking optical system 141 according to the present invention. The CCD 149 is an image pickup element which is driven and controlled by the imaging drive circuit 116, and which converts an amount of light for each pixel of the object image to an electric signal, and outputs to the CDS/ADC section 124.

The CDS/ADC section 124 is a circuit which amplifies the electric signal which is input from the CCD 149, and carries out analog/digital conversion, and outputs to the temporary storage memory 117 image raw data (bare data, hereinafter called as 'RAW data') which is only amplified and converted to digital data.

The temporary storage memory 117 is a buffer which includes an SDRAM (Synchronous Dynamic Random Access Memory) for example, and is a memory device which stores temporarily the RAW data which is output from the CDS/ADC section 124. The image processing section 118 is a circuit which reads the RAW data stored in the temporary storage memory 117, or the RAW data stored in the storage medium section 119, and carries out electrically various image-processing including the distortion correction, based on image-quality parameters specified by the control section 113.

The storage medium section 119 is a recording medium in the form of a card or a stick including a flash memory for instance, detachably mounted. The storage medium section 119 is a control circuit of a device in which, the RAW data transferred from the temporary storage memory 117 and image data subjected to image processing in the image processing section 118 are recorded and maintained in the card flash memory and the stick flash memory.

The display section 120 includes the liquid-crystal display monitor, and is a circuit which displays images and operation menu on the liquid-crystal display monitor. The set-information storage memory section 121 includes a ROM section in which various image quality parameters are stored in advance, and a RAM section which stores image quality parameters which are selected by an input operation on the operating section 112, from among the image quality parameters which are read from the ROM section. The set-information storage memory section 121 is a circuit which controls an input to and an output from the memories.

The digital camera 140 structured in such manner has the taking optical system 141, according to the present invention, which, while having a sufficient wide angle region, and a compact structure, has an extremely stable imaging performance in the entire magnification region at a high magnification. Therefore, it is possible to realize the high performance, the small size, and widening of the angle. Moreover, a prompt focusing operation at the wide angle side and the telephoto side is possible.

As it has been described above, the present invention is useful for a zoom lens system having a high magnification ratio of about seven times, in which, the slimming of. the digital camera is taken into consideration.

As it has been described above, the image pickup apparatus according to the present invention is useful for a video camera and a digital camera with a high zooming and at a low price.

As it is evident from the abovementioned description, according to the present invention, it is possible to provide an image pickup apparatus having a zoom lens system of an inner zoom type with a lens unit structure of a positive, a negative, a positive, and a positive refracting power having a reflecting surface in the optical path, which is advantageous for securing a zooming ratio, with a small size, and securing an image angle.

What is claimed is:

1. An image pickup apparatus having a wide angle zoom lens system, comprising:
a zoom lens system; and
an image pickup element which is disposed at an image side of the zoom lens system, and which changes an image formed by the zoom lens system, to an electric signal, wherein
the zoom lens system consists of, in order from an object side thereof
a first lens unit having a positive refracting power,
a second lens unit having a negative refracting power,
a third lens unit having a positive refracting power,
a fourth lens unit having a positive refracting power, and
an aperture stop which is disposed between the second lens unit and the third lens unit, and
zooming is carried out from a wide angle end to a telephoto end by fixing a position of the first lens unit, and changing a distance between the lens units by moving at least the second lens unit and the third lens unit, and
in a state at the telephoto end, with respect to a state at the wide angle end,
the second lens unit is positioned at the image side,
the third lens unit is positioned at the object side,
a distance between the second lens unit and the aperture stop is narrowed, and
a distance between the aperture stop and the third lens unit is narrowed, and
the first lens unit consists in order from the object side thereof
a front lens component having a negative refracting power,
a reflecting optical member having a reflecting surface which reflects an optical path, and
a rear lens component having a positive refracting power, and
the zoom lens system satisfies the following conditional expressions $$33° < \tan^{-1}(IH_w/f_w) \tag{1}$$

$$3 < f_{1g}/f_w < 5 \tag{2}$$

where,
$f_w$ denotes a focal length of the entire zoom lens system, at a wide angle end,
$IH_w$ denotes a maximum image height at the wide angle end, and
$f_{1g}$ denotes a focal length of the first lens unit.

2. The image pickup apparatus having a wide angle zoom lens system according to claim 1, wherein the front lens component in the first lens unit is one negative lens element.

3. The image pickup apparatus having a wide angle zoom lens system according to claim 2, wherein the following conditional expression is satisfied $$1.5 < |f_{L1}/f_w| < 3 \tag{3}$$

where,
$f_{L1}$ denotes a focal length of the negative lens of the front lens component in the first lens unit.

4. The image pickup apparatus having a wide angle zoom lens system according to claim 2, wherein the following conditional expression is satisfied $$1.85 < N_{L1} \tag{4}$$

where,
$N_{L1}$ denotes a refractive index of the negative lens of the front lens component in the first lens unit, with respect to a d-line.

5. The image pickup apparatus having a wide angle zoom lens system according to claim 2, wherein the following conditional expression is satisfied $$0.5 < (R_{L1f} + R_{L1r})/(R_{L1f} - R_{L1r}) < 1.5 \tag{5}$$

where, $R_{L1f}$ denotes a paraxial radius of curvature of a surface on the object side, of the negative lens of the front lens component in the first lens unit, and $R_{L1r}$ denotes a paraxial radius of curvature of a surface on the image side, of the negative lens of the front lens component in the first lens unit.

6. The image pickup apparatus having a wide angle zoom lens system according to claim 1, wherein the following conditional expression is satisfied $$0.8 < mg_{2z}/mg_{3z} < 1.5 \quad (6)$$

where, $mg_{2z}$ denotes a ratio of zooming of the telephoto end with respect to a magnification of the wide angle end of the second lens unit, and $mg_{3z}$ denotes a ratio of magnification of the telephoto end with respect to a magnification of the wide angle end of the third lens unit.

7. The image pickup apparatus having a wide angle zoom lens system according to claim 1, wherein the apertures stop has a fixed position at the time of zooming, the fourth lens unit moves at the time of zooming, and a length in a direction of an optical axis in which, the fourth lens unit moves is shorter than a length in the direction of the optical axis in which the second lens unit and the third lens unit move.

8. The image pickup apparatus having a wide angle zoom lens system according to claim 1, wherein a focusing from a long-distance object point to a short-distance object point is carried out by moving the fourth lens unit toward the object side.

9. An image pickup apparatus having a wide angle zoom lens system, comprising:

a zoom lens system; and an image pickup element which is disposed at an image side of the zoom lens system, and which changes an image formed by the zoom lens system, to an electric signal, wherein the zoom lens system consists of, in order from an object side thereof a first lens unit having a positive refracting power, a second lens unit having a negative refracting power, a third lens unit having a positive refracting power, a fourth lens unit having a positive refracting power, and an aperture stop which is disposed between the second lens unit and the third lens unit, and zooming is carried out from a wide angle end to a telephoto end by fixing a position of the first lens unit, and changing a distance between the lens units by moving at least the second lens unit and the third lens unit, and in a state at the telephoto end, with respect to a state at the wide angle end, the second lens unit is positioned at the image side, the third lens unit is positioned at the object side, a distance between the second lens unit and the aperture stop is narrowed, and a distance between the aperture stop and the third lens unit is narrowed, and the first lens unit includes consists in order from the object side thereof a front lens component having a negative refracting power, a reflecting optical member having a reflecting surface which reflects an optical path, and a rear lens component having a positive refracting power, and the second lens unit consist of, in order from the object side, three lenses consisting of a negative lens, a positive lens and a negative lens, and the negative lens disposed at the most closest to the object side, has aspheric surface.

10. The image pickup apparatus having a wide angle zoom lens system according to claim 9, wherein the following conditional expression is satisfied $$-1.5 < (R_{2n1f} + R_{2n1r})/(R_{2n1f} - R_{2n1r}) < 0 \quad (A)$$

where, $R_{2n1f}$ is a paraxial radius of curvature of a surface on the object side, of the negative lens nearest to the object side in the second lens unit, and $R_{2n1r}$ is a paraxial radius of curvature of a surface on an image side, of the negative lens nearest to the object side in the second lens unit.

11. The image pickup apparatus having a wide angle zoom lens system according to claim 9, wherein the following conditional expression is satisfied $$33° < \tan^{-1}(IH_w/f_w) \quad (1)$$

where, $f_w$ denotes a focal length of the entire zoom lens system, at a wide angle end, and $IH_w$ denotes a maximum image height at the wide angle end.

12. The image pickup apparatus having a wide angle zoom lens system according to claim 9, wherein the following conditional expression is satisfied $$3 < f_{1g}/f_w < 5 \quad (2)$$

where, $f_{1g}$ denotes a focal length of the first lens unit, and $f_w$ denotes a focal length of the entire zoom lens system, at a wide angle end.

13. The image pickup apparatus having a wide angle zoom lens system according to claim 9, wherein the front lens component in the first lens unit is one negative lens.

14. The image pickup apparatus having a wide angle zoom lens system according to claim 13, wherein the following conditional expression is satisfied $$1.5 < |f_{L1}|/f_w < 3 \quad (3)$$

where, $f_{L1}$ denotes a focal length of the negative lens of the front lens component in the first lens unit.

15. The image pickup apparatus having a wide angle zoom lens system according to claim 13, wherein the following conditional expression is satisfied $$1.85 < N_{L1} \quad (4)$$

where, $N_{L1}$ denotes a refractive index of the negative lens of the front lens component in the first lens unit, with respect to a d-line.

16. The image pickup apparatus having a wide angle zoom lens system according to claim 13, wherein the following conditional expression is satisfied $$0.5 < (R_{L1f} + R_{L1r})/(R_{L1f} - R_{L1r}) < 1.5 \quad (5)$$

where, $R_{L1f}$ denotes a paraxial radius of curvature of a surface on the object side, of the negative lens of the front lens component in the first lens unit, and $R_{L1r}$ denotes a paraxial radius of curvature of a surface on the image side, of the negative lens of the front lens component in the first lens unit.

17. The image pickup apparatus having a wide angle zoom lens system according to claim 9, wherein the following conditional expression is satisfied $$0.8 < mg_{2z}/mg_{3z} < 1.5 \qquad (6)$$

where, $mg_{2z}$ denotes a ratio of magnification of the telephoto end with respect to a magnification of the wide angle end of the second lens unit, and $mg_{3z}$ denotes a ratio of magnification of the telephoto end with respect to a magnification of the wide angle end of the third lens unit.

18. The image pickup apparatus having a wide angle zoom lens system according to claim 9, wherein
the aperture stop has a fixed position at the time of zooming,
the fourth lens unit moves at the time of zooming, and
a length in a direction of an optical axis in which the fourth lens unit moves is shorter than a length in the direction of the optical axis in which the second lens unit and the third lens unit move.

19. The image pickup apparatus having a wide angle zoom lens system according to claim 9, wherein an arrangement is let to be such that a focusing from a long-distance object point to a short-distance object point is carried out by moving the fourth lens unit toward the object side.

* * * * *